(12) United States Patent
  Dai et al.

(10) Patent No.: US 11,782,242 B2
(45) Date of Patent: Oct. 10, 2023

(54) OPTICAL IMAGING LENS ASSEMBLY

(71) Applicant: Zhejiang Sunny Optical Co., Ltd, Ningbo (CN)

(72) Inventors: Fujian Dai, Zhejiang Province (CN); Lin Huang, Zhejiang Province (CN); Yunbing Ji, Zhejiang Province (CN); Liefeng Zhao, Zhejiang Province (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 474 days.

(21) Appl. No.: 17/028,507

(22) Filed: Sep. 22, 2020

(65) Prior Publication Data

US 2021/0109323 A1 Apr. 15, 2021

(30) Foreign Application Priority Data

Oct. 10, 2019 (CN) .......................... 201910957930.9

(51) Int. Cl.
  *G02B 13/00* (2006.01)
  *G02B 9/64* (2006.01)

(52) U.S. Cl.
  CPC ........... *G02B 13/0045* (2013.01); *G02B 9/64* (2013.01)

(58) Field of Classification Search
  CPC ......... A61K 9/0053; A61K 9/007; A61P 1/00; A61P 1/04; A61P 11/00; A61P 11/02; A61P 11/06; A61P 17/00; A61P 17/06; A61P 29/00; A61P 37/00; A61P 37/08; A61P 43/00; B60K 2006/4825; B60K 6/20; B60K 6/24; B60K 6/26; C07C 309/04; C07C 309/08; C07C 309/20; C07C 309/29; C07C 47/19; C07C 53/06; C07D 453/02; C07D 487/04; C07D 487/08; C07D 519/00;
(Continued)

(56) References Cited

U.S. PATENT DOCUMENTS

2017/0045714 A1\* 2/2017 Huang ............... G02B 13/0045

FOREIGN PATENT DOCUMENTS

| CN | 106443986 A | 2/2017 |
| CN | 106443987 A | 2/2017 |
| KR | 10-1287608 B1 | 7/2013 |

OTHER PUBLICATIONS

Communication dated Dec. 24, 2021, issued by the Intellectual Property of India in application No. 202014039745.

\* cited by examiner

*Primary Examiner* — Joseph P Martinez
*Assistant Examiner* — Vipin Patel
(74) *Attorney, Agent, or Firm* — Sughrue Mion, PLLC

(57) ABSTRACT

Disclosed herein is an optical imaging lens assembly, sequentially includes, from an object side to an image side along an optical axis, a first lens having refractive power; a second lens having an refractive power, the image-side surface thereof is concave; a third lens having refractive power; a fourth lens having refractive power; a fifth lens having refractive power; a sixth lens having refractive power; a seventh lens having a positive refractive power, the object-side surface thereof is a convex surface; and an eighth lens having a negative refractive power, the object-side surface thereof is a concave surface; where half of a diagonal length ImgH of an effective pixel area on an image plane of the optical imaging lens assembly satisfies: ImgH≥6.0 mm, and the total effective focal length f of the optical imaging lens assembly and an entrance pupil diameter EPD of the optical imaging lens assembly satisfy: f/EPD<1.8.

18 Claims, 15 Drawing Sheets

(58) Field of Classification Search
CPC .......... F02N 11/0803; F02N 11/0851; F02N 11/0866; F02N 15/06; F02N 15/063; F02N 15/065; F02N 15/067; F02N 2015/061; F02N 2200/022; F02N 2200/041; F02N 2200/101; F02N 2300/106; F16H 1/06; G02B 13/0045; G02B 9/06

See application file for complete search history.

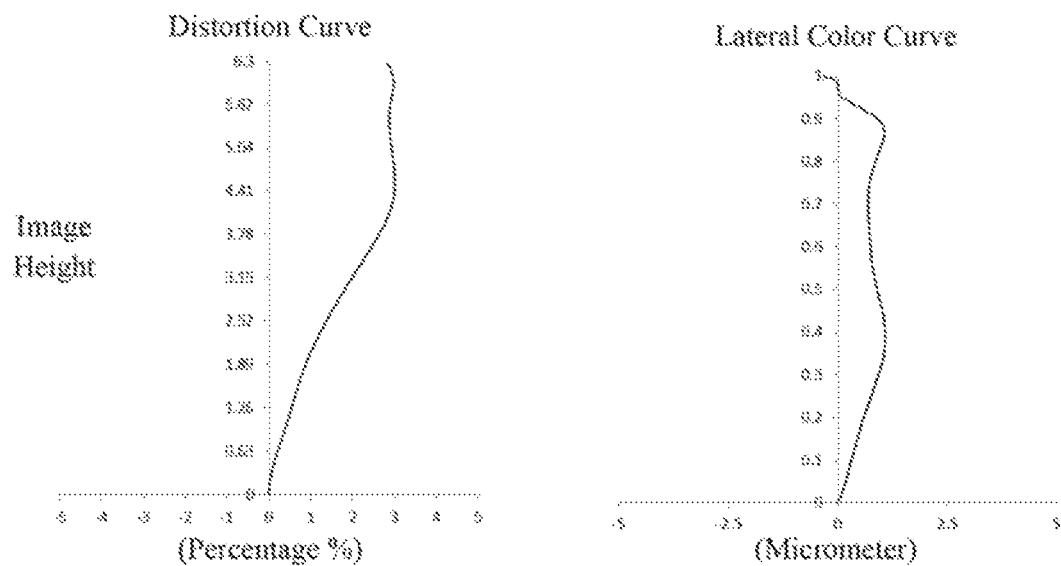
FIG. 14C
FIG. 14D
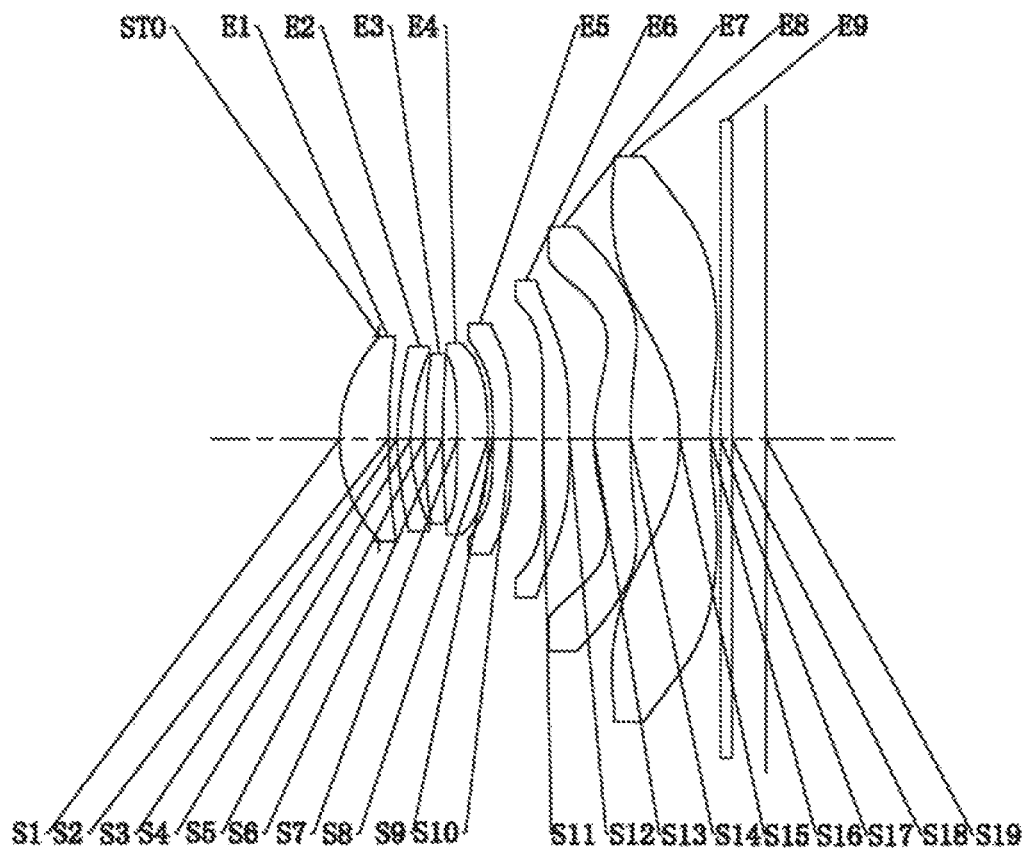
FIG. 15

OPTICAL IMAGING LENS ASSEMBLY

CROSS-REFERENCE TO RELATED APPLICATIONS

This application claims the priority from Chinese Patent Application No. 201910957930.9, filed in the National Intellectual Property Administration (CNIPA) on Oct. 10, 2019, the contents of which are hereby incorporated by reference in their entirety.

TECHNICAL FIELD

The present disclosure relates to an optical imaging lens assembly, and more specifically to an optical imaging lens assembly including eight lenses.

BACKGROUND

With the development of science and technology, the demands in the mobile phone market for lens assemblies applicable to mobile phones gradually increases. At the same time, with the constant changes of market demands, the requirements on performance and configuration of built-in optical imaging lens assemblies of mobile phones are constantly higher. On the one hand, as the thickness of the mobile phone is thinned, the market demands that the built-in optical imaging lens of the mobile phone be miniaturized and thinned. On the other hand, as the performance of the CCD and CMOS image sensors in the mobile phone is improved and the size of the CCD and CMOS image sensors is reduced, the market requires the corresponding optical imaging lens assembly to have a large aperture and a large image plane, so as to cooperate with the image sensors to improve the imaging quality of the mobile phone.

SUMMARY

Embodiments of the present disclosure provide an optical imaging lens assembly applicable to portable electronic device, which can at least solve or partially solve at least one of the above shortcomings in the existing technology.

An aspect of the present disclosure provides an optical imaging lens assembly, the lens assembly includes, along the optical axis from the object side to the image side: a first lens having refractive power; a second lens having refractive power, an image-side surface thereof being concave; a third lens having refractive power; a fourth lens having refractive power; a fifth lens having refractive power; a sixth lens having refractive power; a seventh lens having positive refractive power, an object-side surface thereof being convex; and an eighth lens having negative refractive power, an object-side surface thereof being concave.

In an implementation, half of a diagonal length ImgH of an effective pixel area on an image plane of the optical imaging lens assembly satisfies: ImgH≥6.0 mm.

In an implementation, a total effective focal length f of the optical imaging lens assembly and an entrance pupil diameter EPD of the optical imaging lens assembly satisfy: f/EPD<1.8.

In an implementation, the total effective focal length f of the optical imaging lens assembly and an effective focal length f1 of the first lens satisfy: 0.7<f/f1<1.2.

In an implementation, an effective focal length f8 of the eighth lens and an effective focal length f7 of the seventh lens satisfy: 0.4<|f8/f7|<0.8.

In an implementation, a radius of curvature R16 of an image-side surface of the eighth lens and the total effective focal length f of the optical imaging lens assembly satisfy: 0.8<R16/f<1.2.

In an implementation, a radius of curvature R4 of an image-side surface of the second lens and a combined focal length f123 of the first lens, the second lens and the third lens satisfy: 0.2<R4/f123<0.6.

In an implementation, a radius of curvature R13 of an object-side surface of the seventh lens and a radius of curvature R15 of an object-side surface of the eighth lens satisfy: 0.8<R13/|R15|<1.2.

In an implementation, a radius of curvature R3 of an object-side surface of the second lens and a radius of curvature R1 of an object-side surface of the first lens satisfy: 0<(R3−R1)/(R3+R1)<0.5.

In an implementation, the total effective focal length f of the optical imaging lens assembly, half of a maximal field-of-view Semi-FOV of the optical imaging lens assembly, and an axial distance TTL from an object-side surface of the first lens to an image plane of the optical imaging lens assembly satisfy: 0.5<f×tan(Semi-FOV)/TTL<0.9.

In an implementation, a sum ΣAT of air thicknesses between any two adjacent lenses in the first lens to the eighth lens along an optical axis and a sum ΣCT of center thicknesses of the first lens to the eighth lens along the optical axis satisfy: 0.4<ΣAT/ΣCT<0.9.

In an implementation, an edge thickness ET3 of the third lens and a center thickness CT3 of the third lens on the optical axis satisfy: 0.4<ET3/CT3<1.0.

In an implementation, an axial distance SAG61 from an intersection of an object-side surface of the sixth lens and an optical axis to an apex of an effective radius of the object-side surface of the sixth lens, and an axial distance SAG71 from an intersection of an object-side surface of the seventh lens and the optical axis to an apex of an effective radius of the object-side surface of the seventh lens satisfy: 0.5<SAG61/SAG71<0.9.

In an implementation, a maximum effective radius DT71 of the object-side surface of the seventh lens and a maximum effective radius DT81 of the object-side surface of the eighth lens satisfy: 0.5<DT71/DT81<0.8.

In an implementation, a center thickness CT6 of the sixth lens along the optical axis, a center thickness CT7 of the seventh lens along the optical axis, and an air thickness T67 between the sixth lens and the seventh lens along the optical axis satisfy: 0.1<CT6/(T67+CT7)<0.6.

The optical imaging lens assembly provided in embodiments of the present disclosure includes eight lenses, such as the first to the eighth lens. By reasonably configuring the value range of half of a diagonal length of the effective pixel area on the image plane of the optical imaging lens assembly and the ratio of the total effective focal length f of the optical imaging lens assembly to the entrance pupil diameter EPD of the optical imaging lens assembly, and by optimizing the refractive powers and surface types of the respective lenses to coordinate with each other, the optical imaging lens assembly has the characteristics such as large aperture and large image plane while realizing miniaturization and thinner.

BRIEF DESCRIPTION OF THE DRAWINGS

By describing non-limiting embodiments below in detail with reference to the accompanying drawings, other features, objectives and advantages of the present disclosure will be more apparent. In the accompanying drawings:

FIGS. 14A-14D respectively illustrate a longitudinal aberration curve, an astigmatic curve, a distortion curve and a lateral color curve of the imaging lens assembly according to Embodiment 7;

FIG. 15 is a schematic structural diagram illustrating an imaging lens assembly according to Embodiment 8;

DETAILED DESCRIPTION OF EMBODIMENTS

Figure 1:
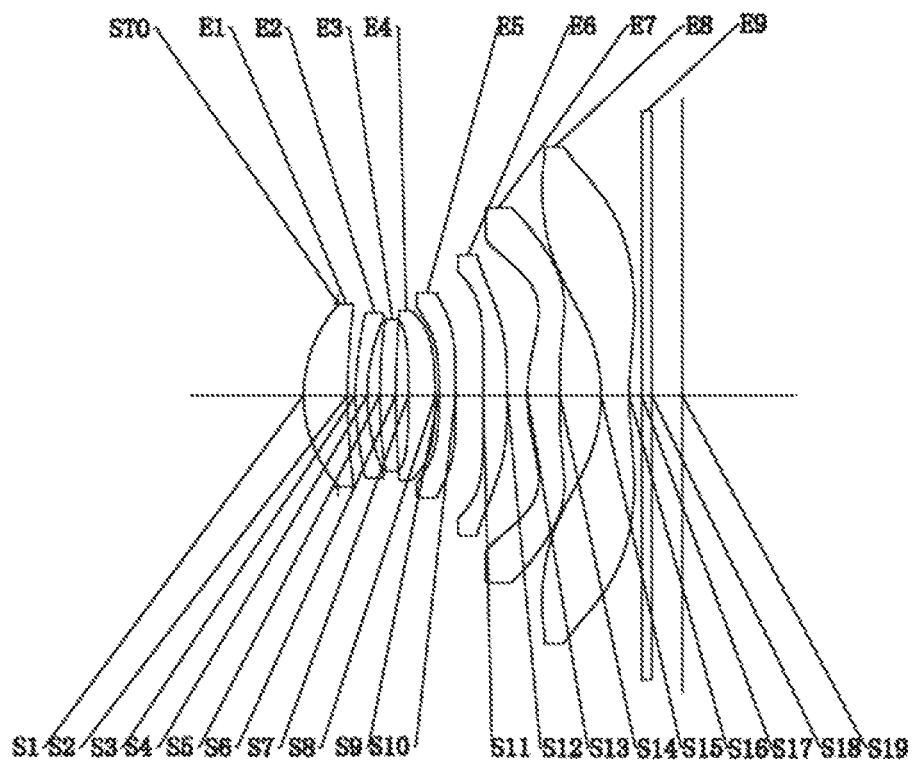
FIG. 1 is a schematic structural diagram illustrating an imaging lens assembly according to Embodiment 1.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size, and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

The optical imaging lens assembly according to implementations of the present disclosure may include eight lenses having refractive powers, that the first lens, the second lens, the third lens, the fourth lens, the fifth lens, the sixth lens, the seventh lens and the eighth lens. The eight lenses arranged along the optical axis from the object side to the image side. There may be air spaces between any two adjacent lenses.

In an exemplary implementation, the first lens may have positive refractive power; the second lens may have negative refractive power, an image-side surface thereof being concave; the third lens may have positive or negative refractive power; the fourth lens may have positive or negative power; the fifth lens may have positive or negative power; the sixth lens may have positive or negative power; the seventh lens may have positive refractive power, and the object-side surface thereof is convex; the eighth lens having negative refractive power, an object-side surface thereof being concave. By reasonably distributing the refractive power and surface type of each lens in the optical system, the aberration of the optical system may be effectively balance, improving imaging quality.

In an exemplary implementation, an object-side surface of the first lens may be convex, and the image-side surface of the first lens may be concave.

In an exemplary implementation, the object-side surface of the second lens may be convex.

In an exemplary implementation, the object-side surface of the third lens may be convex, and the image-side surface of the third lens may be concave.

In an exemplary implementation, the image-side surface of the fourth lens is convex.

In an exemplary implementation, the image-side surface of the eighth length may be concave.

In an exemplary implementation, half of a diagonal length ImgH of an effective pixel area on an image plane of the optical imaging lens assembly satisfies: ImgH≥6.0 mm, for example, 6.0 mm≤ImgH<6.5 mm. A value range of half the diagonal length of the effective pixel area on the image plane of the optical imaging lens assembly is reasonably configured, so that the optical system has a large image plane, thereby facilitating improvement of the imaging clarity of the optical system.

In an exemplary implementation, the total effective focal length f of the optical imaging lens assembly and an entrance pupil diameter EPD of the optical imaging lens assembly satisfy: f/EPD<1.8, for example, 1.6<f/EPD<1.8. The ratio of the total effective focal length of the optical imaging lens to the entrance pupil of the optical imaging lens is reasonably set, which is advantageous for realizing the characteristics of high pixel and large aperture of the optical system.

In an exemplary implementation, the total effective focal length f of the optical imaging lens assembly and the effective focal length f1 of the first lens satisfy: 0.7<f/f1<1.2. The ratio of the total effective focal length of the optical imaging lens assembly to the effective focal length of the first lens is set to be within a reasonable numerical range, so that the spherical aberration of the optical imaging lens assembly is controlled to be within a reasonable range, so that the rear lens group can effectively correct the negative spherical aberration of the optical imaging lens assembly and improve the imaging quality at the on-axis field of the optical system.

In an exemplary implementation, the effective focal length f8 of the eighth lens and the effective focal length f7 of the seventh lens satisfy: 0.4<|f8/f7|<0.8. The ratio of the effective focal lengths of the seventh lens to the eighth lens is reasonably set, and the refractive power of the optical system is effectively distributed, so that the chromatic aberration and the field curvature of the optical system are corrected, so that the spherical aberration generated by the seventh lens and the positive spherical aberration generated by the eighth lens cancel each other, thereby improving the imaging quality of the optical system.

In an exemplary implementation, the radius of curvature R16 of the image-side surface of the eighth lens and the total effective focal length f of the optical imaging lens assembly satisfy: 0.8<R16/f<1.2. The ratio of the radius of curvature of the image-side surface of the eighth lens to the total effective focal length of the optical imaging lens assembly can be reasonably set, so that the eighth lens can be prevented from being too curved, which is beneficial to reducing the processing difficulty of the lens, balancing the system chromatic aberration, and reducing distortion.

In an exemplary implementation, the radius of curvature R4 of the image-side surface of the second lens and the combined focal length f123 of the first lens, the second lens and the third lens satisfy: 0.2<R4/f123<0.6. By setting the ratio of the radius of curvature of the image-side surface of the second lens to the combined focal length of the first lens, the second lens and the third lens within a reasonable numerical range, it is advantageous to improve the field curvature and distortion of the optical imaging lens assembly and reduce the processing difficulty of the second lens.

In an exemplary implementation, the radius of curvature R13 of the object-side surface of the seventh lens and the radius of curvature R15 of the object-side surface of the eighth lens satisfy: 0.8<R13/|R15|<1.2. The radius of curvature of the object-side surface of the seventh lens and the radius of curvature of the object-side surface of the eighth lens and the proportional relationship thereof are reasonably set, so that the incident angle of the chief ray of each field in the optical system is controlled to meet the requirement of matching the incident angle of the chief ray with the chip in the optical system design.

In an exemplary implementation, the radius of curvature R3 of the object-side surface of the second lens and the radius of curvature R1 of the object-side surface of the first lens satisfy: 0<(R3−R1)/(R3+R1)<0.5, for example, 0.3<(R3−R1)/(R3+R1)<0.5. The relationship between the radius of curvature of the object-side surface of the second lens and the radius of curvature of the object-side surface of the first lens is reasonably set, and it is advantageous to control the deflection angle at the object-side of the first lens at the edge to be within a reasonable range so as to reduce the sensitivity of the optical system.

In an exemplary implementation, the total effective focal length f of the optical imaging lens assembly, half of a maximal field-of-view Semi-FOV of the optical imaging lens assembly, and an axial distance TTL from an object-side surface of the first lens to an image plane of the optical imaging lens assembly satisfy: 0.5<×tan(Semi-FOV)/TTL<0.9, for example, 0.7<f×tan (Semi-FOV)/TTL<0.9. By reasonably setting the relationship between the total effective focal length of the optical imaging lens assembly, half of the maximal field-of-view Semi-FOV of the optical imaging lens assembly, and the axial distance TTL from the object-side surface of the first lens to the image plane of the optical imaging lens assembly, it facilitates matching the lens assembly to a chip having a large image plane, so that the optical system has characteristics such as high pixel, low sensitivity, and easy processing.

In an exemplary implementation, the sum ΣAT of air thicknesses between any two adjacent lenses in the first lens to the eighth lens along the optical axis and the sum ΣCT of center thicknesses of the first lens to the eighth lens along the optical axis satisfy: 0.4<ΣAT/ΣCT<0.9. By reasonably setting the proportional relationship between the sum of air thicknesses between any two adjacent lenses in the first lens to the eighth lens along the optical axis and the sum $\Sigma CT$ of center thicknesses of the first lens to the eighth lens along the optical axis, the processing and assembling characteristics of the imaging lens assembly can be ensured, and problems such as interference between front-and-rear lens in the assembling process due to a too small gap between the lenses are avoided. In the present embodiment, the above-mentioned relationship is further provided to reduce the light deflection in the optical system, adjust the field curvature of the optical imaging lens assembly, reduce the system sensitivity, and improve the imaging quality.

In an exemplary implementation, the edge thickness ET3 of the third lens and the center thickness CT3 of the third lens on the optical axis satisfy: $0.4<ET3/CT3<1.0$, for example, $0.6<ET3/CT3<1.0$. The proportional relationship between the edge thickness of the third lens and the center thickness of the third lens on the optical axis is reasonably set, so that both the processing and the forming of the lens are facilitated, and the deformation amount generated during the assembly of the lens is reduced, thereby reducing the assembly difficulty.

In an exemplary implementation, the axial distance SAG61 from the intersection of the object-side surface of the sixth lens and the optical axis to the apex of the effective radius of the object-side surface of the sixth lens, and the axial distance SAG71 from the intersection of the object-side surface of the seventh lens and the optical axis to the apex of the effective radius of the object-side surface of the seventh lens satisfy: $0.5<SAG61/SAG71<0.9$, for example, $0.5<SAG61/SAG71<0.7$. The relationship between the axial distance SAG61 from the intersection of the object-side surface of the sixth lens and the optical axis to the apex of the effective radius of the object-side surface of the sixth lens, and the axial distance SAG71 from the intersection of the object-side surface of the seventh lens and the optical axis to the apex of the effective radius of the object-side surface of the seventh lens can be reasonably set, so that excessive bending of the sixth lens and the seventh lens can be avoided, the lens processing difficulty can be reduced, and the assembly stability of the optical imaging lens assembly group can be improved.

In an exemplary implementation, the maximum effective radius DT71 of the object-side surface of the seventh lens and the maximum effective radius DT81 of the object-side surface of the eighth lens satisfy: $0.5<DT71/DT81<0.8$. The proportional relationship between the maximum effective radius of the object-side surface of the seventh lens and the maximum effective radius of the object-side surface of the eighth lens is reasonably set, so that the excessive aperture difference between the seventh lens and the eighth lens can be avoided, the difficulty in assembling the lens can be reduced, and the assembling stability of the lens can be improved.

In an exemplary implementation, the center thickness CT6 of the sixth lens along the optical axis, the center thickness CT7 of the seventh lens along the optical axis, and the air thickness T67 between the sixth lens and the seventh lens along the optical axis satisfy: $0.1<CT6/(T67+CT7)<0.6$, for example, $0.3<CT6/(T67+CT7)<0.6$. The relationship between the central thickness of the sixth lens along the optical axis, the central thickness of the seventh lens along the optical axis, and the air thickness between the sixth lens and the seventh lens along the optical axis is reasonably set, so that the size of the optical imaging lens assembly can be reduced, the oversize of the lens can be avoided, the assem-bly difficulty of the lens assembly can be reduced, and the high space utilization rate can be realized.

In an exemplary implementation, the above-described optical imaging assembly may further include at least one diaphragm. The diaphragm may be disposed in an appropriate position as desired, for example, between the object side and the first lens E1. Alternatively, the above-described optical imaging system may further comprise a filter for correcting color deviations and/or a protective glass for protecting the photosensitive element located on the image plane.

The optical imaging lens assembly according to the above implementations of the present disclosure may employ a plurality of lenses, such as eight lenses as described above. The optical imaging lens assembly of the present disclosure satisfies the requirements of large aperture, large image plane, high pixel, portability, and the like, and still has a clear imaging effect in a shooting environment in which light is insufficient such as a rainy day and a dusk.

In an exemplary implementation, at least one of the surfaces of lenses is aspheric, that is, at least one of the object-side surface of the first lens to the image-side surface of the eighth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Alternatively, at least one of the object-side surface or the image-side surface of any one of the first lens, the second lens, the third lens, the fourth lens, the fifth lens, the seventh lens and the eighth lens is aspheric. Alternatively, the object-side surface and image-side surface of any one of the first lens, the second lens, the third lens, the fourth lens, the fifth lens, the sixth lens, the seventh lens and the eighth lens are aspheric surfaces.

An embodiment of the present disclosure further provides an imaging device, having a photosensitive element which may be a photosensitive charge-coupled device (CCD) or a complementary metal-oxide semiconductor (CMOS) element. The imaging device may be an independent imaging device such as a digital camera, or may be an imaging module integrated in a mobile electronic device such as a mobile phone. The imaging device is equipped with the optical imaging system described above.

An exemplary implementation of the present disclosure also provides an electronic device including the imaging device described above.

However, it will be understood by those skilled in the art that the number of lenses constituting the optical imaging lens assembly may be varied to achieve the various results and advantages described in this disclosure without departing from the technical solution claimed by the present disclosure. For example, although embodiments are described by taking eight lenses as an example, the optical imaging lens assembly is not limited to include eight lenses. The optical imaging lens assembly may also include other numbers of lenses if desired.

Some specific embodiments of an optical imaging lens assembly applicable to the above implementations will be further described below with reference to the accompanying drawings.

Embodiment 1

An optical imaging lens assembly according to Embodiment 1 of the present disclosure is described below with reference to FIG. 1 to FIG. 2D. FIG. 1 shows a schematic structural diagram of the optical imaging lens assembly according to Embodiment 1 of the present disclosure.

As shown in FIG. 1, the optical imaging lens assembly sequentially includes, along the optical axis from the object side to the image side, a diaphragm STO, a first lens E1, a second lens E2, a third lens E3, a fourth lens E4, a fifth lens E5, a sixth lens E6, a seventh lens E7, an eighth lens E8, an optical filter E9 and an image plane E19.

The first lens E1 has a positive refractive power, the object-side surface S1 thereof is a convex surface, and the image-side surface S2 thereof is a concave surface. The second lens E2 has a negative refractive power, the object-side surface S3 thereof is a convex surface, and the image-side surface S4 thereof is a concave surface. The third lens E3 has a positive refractive power, the object-side surface S5 thereof is a convex surface, and the image-side surface S6 thereof is a concave surface. The fourth lens E4 has a positive refractive power, the object-side surface S7 thereof is a concave surface, and the image-side surface S8 thereof is a convex surface. The fifth lens E5 has a negative refractive power, the object-side surface S9 thereof is a concave surface, and the image-side surface S10 thereof is a convex surface. The sixth lens E6 has a positive refractive power, the object-side surface S11 thereof is a concave surface, and the image-side surface S12 thereof is a convex surface. The seventh lens E7 has a positive refractive power, the object-side surface S13 thereof is a convex surface, and the image-side surface S14 thereof is a concave surface. The eighth lens E8 has a negative refractive power, the object-side surface S15 thereof is a concave surface, and the image-side surface S16 thereof is a concave surface. The optical filter E9 has the object-side surface S17 and the image-side surface S18. The light from an object sequentially passes through the respective surfaces S1 to S18 and is finally imaged on the image plane S19.

Table 1 below is a table illustrating basic parameters of the optical imaging lens assembly of Embodiment 1, where the units for the radius of curvature, the thickness/distance and the focal length are millimeter (mm).

TABLE 1

| Surface Number | Surface Type | Radius of Curvature | Thickness/ Distance | Material Refractive Index | Abbe Number | Focal Length | Conic Coefficient |
|---|---|---|---|---|---|---|---|
| OBJ | spherical | Infinite | Infinite | | | | |
| STO | spherical | Infinite | −0.7300 | | | | |
| S1 | aspheric | 2.8615 | 0.9278 | 1.55 | 56.1 | 6.74 | 0.0000 |
| S2 | aspheric | 11.4025 | 0.1692 | | | | 0.0000 |
| S3 | aspheric | 5.4271 | 0.2500 | 1.68 | 19.2 | −17.75 | 0.0000 |
| S4 | aspheric | 3.6700 | 0.2649 | | | | 0.0000 |
| S5 | aspheric | 10.0878 | 0.3392 | 1.55 | 56.1 | 70.17 | −34.8831 |
| S6 | aspheric | 13.5308 | 0.2632 | | | | 0.0000 |
| S7 | aspheric | −43.6669 | 0.5722 | 1.57 | 37.3 | 17.84 | 0.0000 |
| S8 | aspheric | −8.2936 | 0.0758 | | | | 0.0000 |
| S9 | aspheric | −14.1808 | 0.3496 | 1.68 | 19.2 | −21.39 | 0.0000 |
| S10 | aspheric | −666.9252 | 0.5925 | | | | 0.0000 |
| 511 | aspheric | −6019.8995 | 0.5000 | 1.57 | 37.3 | 188.82 | 0.0000 |
| S12 | aspheric | −105.8121 | 0.4249 | | | | 0.0000 |
| S13 | aspheric | 3.3811 | 0.6900 | 1.55 | 56.1 | 6.54 | −12.5251 |
| S14 | aspheric | 58.4845 | 0.8707 | | | | 0.0000 |
| S15 | aspheric | −3.6025 | 0.5935 | 1.54 | 55.7 | −4.23 | −2.3578 |
| S16 | aspheric | 6.4776 | 0.2666 | | | | 0.0000 |
| S17 | spherical | Infinite | 0.2100 | 1.52 | 64.2 | | |
| S18 | spherical | Infinite | 0.6434 | | | | |
| S19 | spherical | Infinite | | | | | |

In the present embodiment, the total effective focal length f of the optical imaging lens assembly is 6.49 mm, the axial distance TTL from the object-side surface S1 of the first lens E1 to the image plane S19 is 8.00 mm, half the diagonal length ImgH of the effective pixel area on the image plane S19 is 6.27 mm, half of a maximal field-of-view Semi-FOV of the optical imaging lens assembly is 43.3°, and the aperture value Fno of the optical imaging lens assembly is 1.68.

In Embodiment 1, the aspheric lens may be used for both of the object-side surface and image-side surface of any one of the first lens E1 to the eighth lens E8, and the surface type x of each aspheric surface may defined, but is not limited to, by the following formula:

$$x = \frac{ch^2}{1+\sqrt{1-(k+1)c^2h^2}} + \sum A_i h^i \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 2 above); and Ai is the correction coefficient of the $i^{th}$ order of the aspheric surface. Table 2 below shows the high-order coefficients A4, A6, A8, A10, A12, A14, A16, A18 and A20 applicable to the aspheric surfaces S1-S16 of the aspheric lenses in the present embodiment.

The first lens E1 has a positive refractive power, the object-side surface S1 thereof is a convex surface, and the image-side surface S2 thereof is a concave surface. The second lens E2 has a negative refractive power, the object-side surface S3 thereof is a convex surface, and the image-side surface S4 thereof is a concave surface. The third lens E3 has a negative refractive power, the object-side surface S5 thereof is a convex surface, and the image-side surface S6 thereof is a concave surface. The fourth lens E4 has a positive refractive power, the object-side surface S7 thereof is a concave surface, and the image-side surface S8 thereof

TABLE 2

| Surface Number | A4 | A6 | A8 | A10 | A12 | A14 | A16 | A18 | A20 |
|---|---|---|---|---|---|---|---|---|---|
| S1 | 1.6297E−04 | 4.4260E−04 | −2.1260E−04 | 4.6563E−05 | 4.4005E−06 | −3.6651E−06 | 5.3780E−07 | −4.3224E−08 | 0.0000E+00 |
| S2 | −7.9080E−03 | 3.9420E−03 | −1.2089E−03 | 2.1196E−04 | −1.8948E−05 | 4.6528E−07 | 0.0000E+00 | 0.0000E+00 | 0.0000E+00 |
| S3 | −2.4097E−02 | 1.0668E−02 | −3.2863E−03 | 8.0415E−04 | −1.6575E−04 | 2.3251E−05 | −1.0118E−06 | 0.0000E+00 | 0.0000E+00 |
| S4 | −1.6979E−02 | 9.4060E−03 | −5.0210E−03 | 3.6188E−03 | −1.9219E−03 | 5.2694E−04 | −4.3340E−05 | −3.4553E−06 | 0.0000E+00 |
| S5 | 4.4966E−04 | −2.5017E−03 | 2.9881E−03 | −2.6830E−03 | 1.6745E−03 | −4.6835E−04 | −9.2629E−07 | 4.0140E−05 | −7.3286E−06 |
| S6 | −4.9584E−03 | −8.2263E−03 | 1.3267E−02 | −1.7590E−02 | 1.5081E−02 | −7.9732E−03 | 2.5549E−03 | −4.4775E−04 | 3.2940E−05 |
| S7 | −8.0963E−03 | −2.3979E−03 | −1.0969E−02 | 1.6334E−02 | −1.4900E−02 | 8.2523E−03 | −2.7423E−03 | 4.9697E−04 | −3.7522E−05 |
| S8 | 2.3818E−02 | −9.6287E−02 | 1.2146E−01 | −1.1010E−01 | 6.8226E−02 | −2.7754E−02 | 6.9940E−03 | −9.8484E−04 | 5.9298E−05 |
| S9 | 1.2659E−02 | −1.0493E−01 | 1.2726E−01 | −1.0763E−01 | 6.4059E−02 | −2.5242E−02 | 6.1314E−03 | −8.1978E−04 | 4.5749E−05 |
| S10 | −7.5600E−03 | −2.8490E−02 | 2.4770E−02 | −1.4057E−02 | 5.7866E−03 | −1.6611E−03 | 3.0412E−04 | −3.1001E−05 | 1.3200E−06 |
| S11 | −7.4632E−03 | 4.3832E−03 | −3.5849E−03 | 1.4809E−03 | −4.1846E−04 | 7.9525E−05 | −9.8345E−06 | 7.1440E−07 | −2.2625E−08 |
| S12 | −4.6008E−02 | 1.7166E−02 | −5.0737E−03 | 1.1092E−03 | −1.6965E−04 | 1.7785E−05 | −1.1950E−06 | 4.4125E−08 | −6.2365E−10 |
| S13 | 9.9909E−03 | −9.4992E−03 | 2.8090E−03 | −8.4727E−04 | 1.7864E−04 | −2.3696E−05 | 1.9108E−06 | −8.4869E−08 | 1.5787E−09 |
| S14 | 2.5586E−02 | −7.9918E−03 | 5.2096E−04 | 8.8748E−05 | −2.4577E−05 | 2.8236E−06 | −1.8010E−07 | 6.0945E−09 | −8.4670E−11 |
| S15 | −9.9321E−03 | 9.5546E−04 | 2.2278E−04 | −4.6112E−05 | 3.8452E−06 | −1.8045E−07 | 5.0073E−09 | −7.7264E−11 | 5.1437E−13 |
| S16 | −2.1176E−02 | 3.2652E−03 | −4.7106E−04 | 5.0185E−05 | −3.5891E−06 | 1.6257E−07 | −4.4325E−09 | 6.6237E−11 | −4.1683E−13 |

Figure 2A:
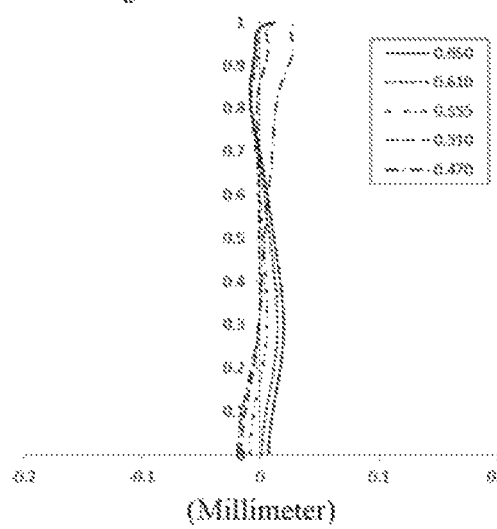
FIGS. 2A-2D respectively illustrate a longitudinal aberration curve, an astigmatic curve, a distortion curve and a lateral color curve of the imaging lens assembly according to Embodiment 1.
Figure 2B:
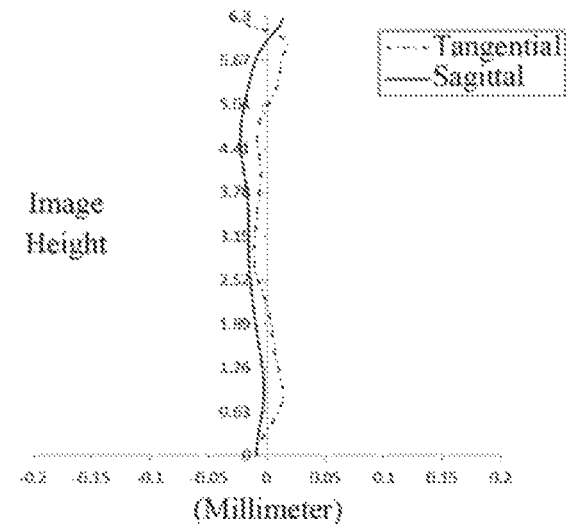
Figure 2C:
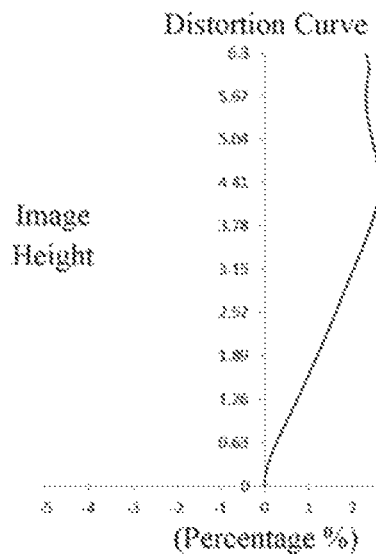
Figure 2D:
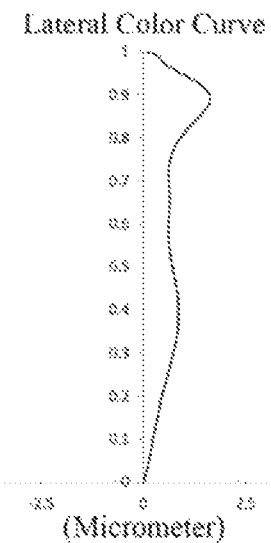

FIG. 2A illustrates a longitudinal aberration curve of the optical imaging system according to Embodiment 1, representing deviations of focal points converged by light of different wavelengths after passing through the optical imaging system. FIG. 2B illustrates an astigmatic curve of the optical imaging system according to Embodiment 1, representing a curvature of a tangential plane and a curvature of a sagittal plane. FIG. 2C illustrates a distortion curve of the optical imaging system according to Embodiment 1, representing amounts of distortion at different image heights. FIG. 2D illustrates a lateral color curve of the optical imaging system according to Embodiment 1, representing deviations of different image heights on the imaging plane after light passes through the optical imaging system. It can be seen from FIG. 2A to FIG. 2D that the optical imaging lens assembly provided in Embodiment 1 may achieve good imaging quality.

Embodiment 2

Figure 3:
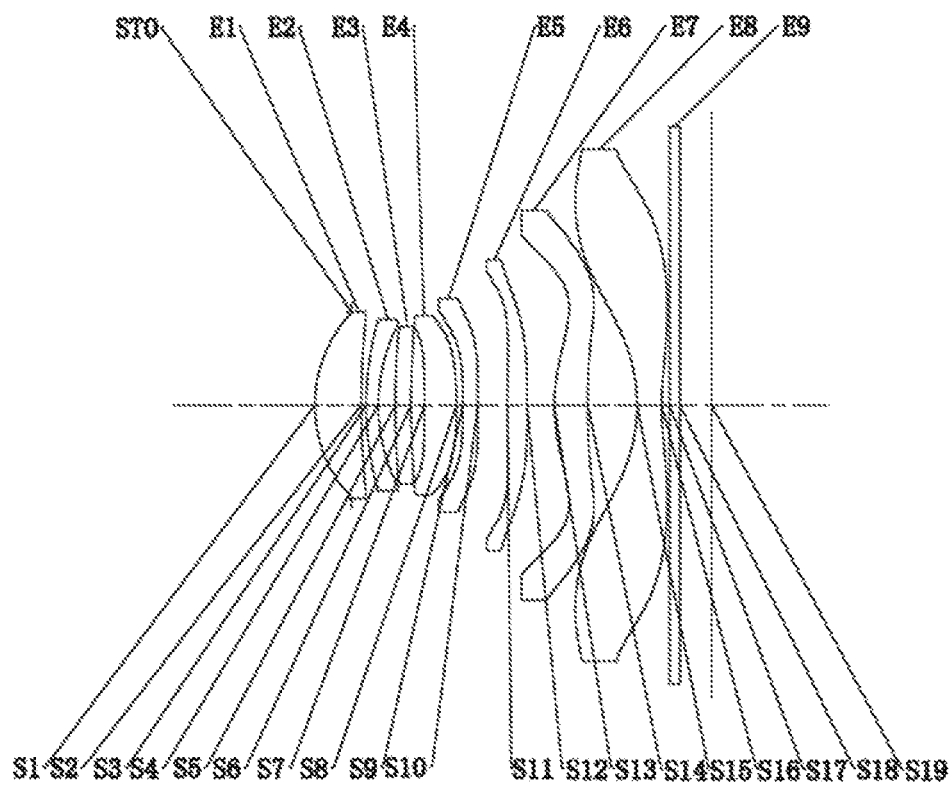
FIG. 3 is a schematic structural diagram illustrating an imaging lens assembly according to Embodiment 2.

An imaging lens assembly according to Embodiment 2 of the present disclosure is described with reference to FIG. 3 to FIG. 4D. FIG. 3 shows the schematic structural diagram of the optical imaging lens assembly according to Embodiment 2 of the present disclosure.

As shown in FIG. 3, the optical imaging lens assembly sequentially includes, along the optical axis from the object side to the image side, a diaphragm STO, a first lens E1, a second lens E2, a third lens E3, a fourth lens E4, a fifth lens E5, a sixth lens E6, a seventh lens E7, an eighth lens E8, an optical filter E9 and an image plane E19.

is a convex surface. The fifth lens E5 has a negative refractive power, the object-side surface S9 thereof is a concave surface, and the image-side surface S10 thereof is a concave surface. The sixth lens E6 has a positive refractive power, the object-side surface S11 thereof is a convex surface, and the image-side surface S12 thereof is a concave surface. The seventh lens E7 has a positive refractive power, the object-side surface S13 thereof is a convex surface, and the image-side surface S14 thereof is a concave surface. The eighth lens E8 has a negative refractive power, the object-side surface S15 thereof is a concave surface, and the image-side surface S16 thereof is a concave surface. The optical filter E9 has the object-side surface S17 and the image-side surface S18. The light from an object sequentially passes through the respective surfaces S1 to S18 and is finally imaged on the image plane S19.

In the present embodiment, the total effective focal length f of the optical imaging lens assembly is 6.58 mm, the axial distance TTL from the object-side surface S1 of the first lens E1 to the image plane S19 is 8.04 mm, half the diagonal length ImgH of the effective pixel area on the image plane S19 is 6.00 mm, half of a maximal field-of-view Semi-FOV of the optical imaging lens assembly is 41.5°, and the aperture value Fno of the optical imaging lens assembly is 1.72.

Table 3 below is a table illustrating basic parameters of the optical imaging lens assembly of Embodiment 2, where the units for the radius of curvature, the thickness/distance and the focal length are millimeter (mm).

TABLE 3

| Surface Number | Surface Type | Radius of Curvature | Thickness/ Distance | Material Refractive Index | Material Abbe Number | Focal Length | Conic Coefficient |
|---|---|---|---|---|---|---|---|
| OBJ | spherical | Infinite | Infinite | | | | |
| STO | spherical | Infinite | −0.7379 | | | | |
| S1 | aspheric | 2.8233 | 0.9380 | 1.55 | 56.1 | 6.23 | 0.0000 |
| S2 | aspheric | 14.7223 | 0.0989 | | | | 0.0000 |
| S3 | aspheric | 5.3752 | 0.2500 | 1.68 | 19.2 | −15.89 | 0.0000 |
| S4 | aspheric | 3.5181 | 0.3422 | | | | 0.0000 |
| S5 | aspheric | 14.5523 | 0.3200 | 1.55 | 56.1 | −499.99 | −75.9745 |
| S6 | aspheric | 13.7084 | 0.2751 | | | | 0.0000 |
| S7 | aspheric | −34.1467 | 0.6474 | 1.57 | 37.3 | 19.39 | 0.0000 |
| S8 | aspheric | −8.4111 | 0.1284 | | | | 0.0000 |
| S9 | aspheric | −18.4277 | 0.3000 | 1.68 | 19.2 | −25.28 | 0.0000 |
| S10 | aspheric | 245.1300 | 0.5988 | | | | 0.0000 |
| S11 | aspheric | 21.5354 | 0.4008 | 1.57 | 37.3 | 112.45 | 0.0000 |
| S12 | aspheric | 32.2014 | 0.5537 | | | | 0.0000 |
| S13 | aspheric | 3.5669 | 0.6823 | 1.55 | 56.1 | 6.86 | −7.5461 |
| S14 | aspheric | 70.7562 | 0.9949 | | | | 0.0000 |
| S15 | aspheric | −3.5972 | 0.5000 | 1.54 | 55.7 | −4.18 | −2.3589 |
| S16 | aspheric | 6.2463 | 0.1594 | | | | 0.0000 |
| S17 | spherical | Infinite | 0.2100 | 1.52 | 64.2 | | |
| S18 | spherical | Infinite | 0.6429 | | | | |
| S19 | spherical | Infinite | | | | | |

In Embodiment 2, the aspheric lens may be used for both of the object-side surface and image-side surface of any one of the first lens E1 to the eighth lens E8. Table 4 below shows the high-order coefficients A4, A6, A8, A10, A12, A14, A16, A18 and A20 applicable to the aspheric surfaces S1-S16 of the aspheric lenses in the present embodiment.

TABLE 4

| Surface Number | A4 | A6 | A8 | A10 | A12 | A14 | A16 | A18 | A20 |
|---|---|---|---|---|---|---|---|---|---|
| S1 | 7.5968E−04 | 5.6215E−05 | 3.2410E−05 | −8.3292E−06 | −1.9856E−06 | 1.4490E−06 | −3.7035E−07 | 0.0000E+00 | 0.0000E+00 |
| S2 | −7.6269E−03 | 6.6637E−03 | −34639E−03 | 1.1113E−03 | −2.0451E−04 | 1.6094E−05 | 0.0000E+00 | 0.0000E+00 | 0.0000E+00 |
| S3 | −1.9992E−02 | 1.1880E−02 | −5.1786E−03 | 1.5854E−03 | −2.5182E−04 | 6.1037E−06 | 2.6396E−06 | 0.0000E+00 | 0.0000E+00 |
| S4 | −1.2684E−02 | 8.5126E−03 | −4.5283E−03 | 2.7180E−03 | −1.1801E−03 | 3.2146E−04 | −3.7539E−05 | 0.0000E+00 | 0.0000E+00 |
| S5 | −1.6352E−03 | −4.1052E−03 | 1.0973E−02 | −1.6629E−02 | 1.6007E−02 | −9.5023E−03 | 3.4616E−03 | −7.0405E−04 | 6.1191E−05 |
| S6 | −7.3307E−03 | −3.4575E−04 | −2.1822E−03 | 3.6980E−03 | −3.1390E−03 | 1.6103E−03 | −4.4961E−04 | 6.4104E−05 | −3.7157E−06 |
| S7 | −8.6341E−03 | −8.8012E−03 | 5.6650E−03 | −4.1863E−03 | −2.0242E−04 | 2.0689E−03 | −1.3604E−03 | 3.9162E−04 | −4.4585E−05 |
| S8 | 8.3152E−03 | −5.2090E−02 | 5.5842E−02 | −4.3951E−02 | 2.3883E−02 | −8.9136E−03 | 2.2080E−03 | −3.2740E−04 | 2.1859E−05 |
| S9 | 2.8377E−04 | −5.8579E−02 | 4.5796E−02 | −1.9365E−02 | 2.7877E−03 | 1.3672E−03 | −7.6054E−04 | 1.4577E−04 | −1.0250E−05 |
| S10 | −5.5774E−03 | −3.0351E−02 | 2.2388E−02 | −9.8501E−03 | 2.7271E−03 | −4.0975E−04 | 1.4185E−05 | 4.1947E−06 | −4.1283E−07 |
| S11 | −1.5048E−02 | 6.2987E−03 | −2.6854E−03 | 7.8531E−04 | −1.9710E−04 | 3.5965E−05 | −4.2324E−06 | 2.9253E−07 | −8.9708E−09 |
| S12 | −4.5483E−02 | 1.7023E−02 | −5.2547E−03 | 1.4941E−03 | −3.6287E−04 | 6.1252E−05 | −6.2638E−06 | 3.4556E−07 | −7.8891E−09 |
| S13 | 1.7142E−03 | −2.3821E−03 | −1.1311E−05 | 5.1850E−05 | −1.4674E−05 | 2.2352E−06 | −1.7423E−07 | 6.7515E−09 | −1.0597E−10 |
| S14 | 2.4721E−02 | −7.0064E−03 | 6.7585E−04 | −1.2180E−05 | −6.5349E−06 | 1.0567E−06 | −7.7204E−08 | 2.7798E−09 | 3.9634E−11 |
| S15 | −8.9204E−03 | 1.1194E−03 | 8.9337E−05 | −2.3274E−05 | 1.8956E−06 | −8.3642E−08 | 2.1451E−09 | −3.0160E−11 | 1.7989E−13 |
| S16 | −2.2183E−02 | 3.7639E−03 | −5.5413E−04 | 5.7869E−05 | −4.0074E−06 | 1.7633E−07 | −4.7099E−09 | 6.9662E−11 | −4.3910E−13 |

Figure 4A:
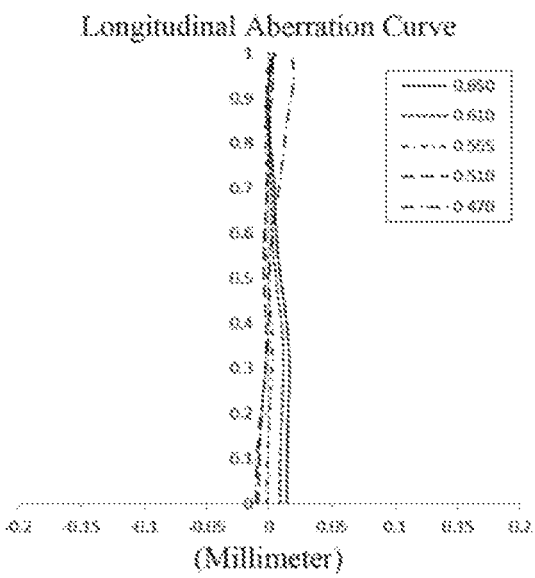
FIGS. 4A-4D respectively illustrate a longitudinal aberration curve, an astigmatic curve, a distortion curve and a lateral color curve of the imaging lens assembly according to Embodiment 2.
Figure 4B:
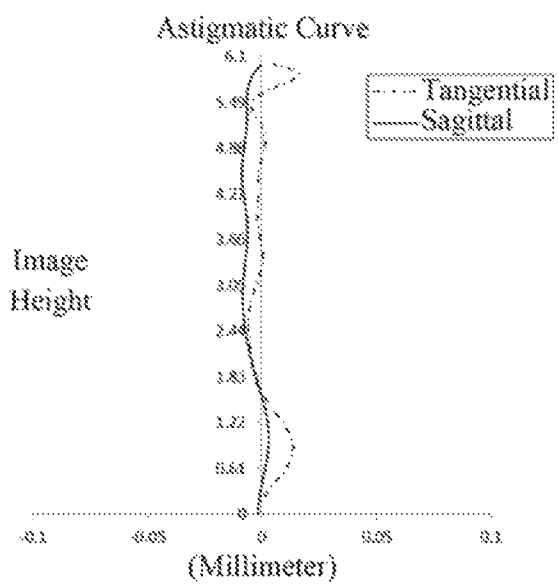
Figure 4C:
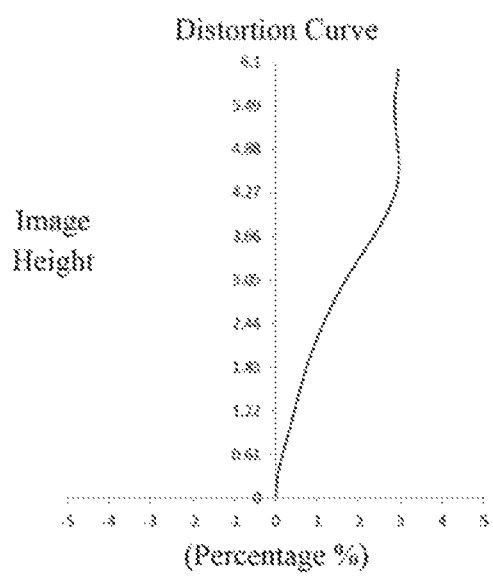
Figure 4D:
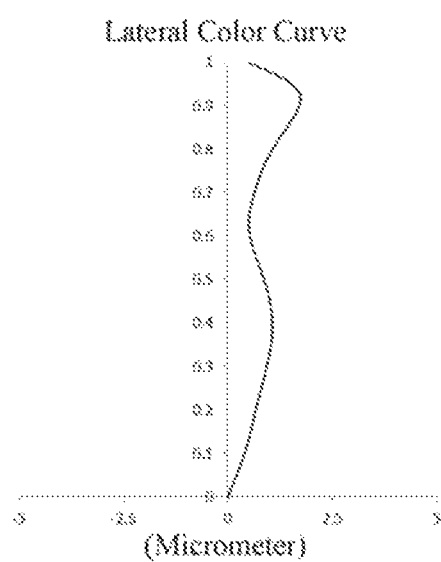

FIG. 4A illustrates a longitudinal aberration curve of the optical imaging system according to Embodiment 2, representing deviations of focal points converged by light of different wavelengths after passing through the optical imaging system. FIG. 4B illustrates an astigmatic curve of the optical imaging system according to Embodiment 2, representing a curvature of a tangential plane and a curvature of a sagittal plane. FIG. 4C illustrates a distortion curve of the optical imaging system according to Embodiment 2, representing amounts of distortion at different image heights. FIG. 4D illustrates a lateral color curve of the optical imaging system according to Embodiment 2, representing deviations of different image heights on the imaging plane after light passes through the optical imaging system. It can be seen from FIG. 4A to FIG. 4D that the optical imaging lens assembly provided in Embodiment 2 may achieve good imaging quality.

Embodiment 3

Figure 5:
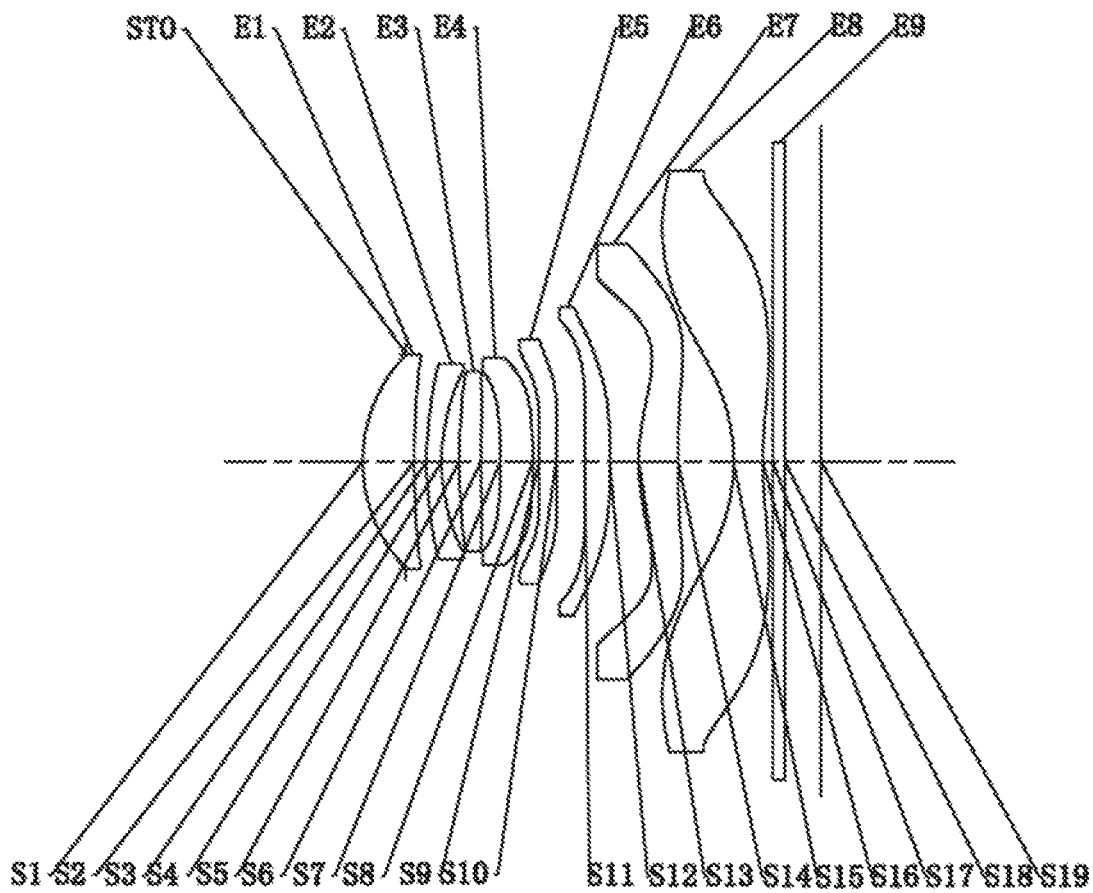
FIG. 5 is a schematic structural diagram illustrating an imaging lens assembly according to Embodiment 3.

An imaging lens assembly according to Embodiment 3 of the present disclosure is described with reference to FIG. 5 to FIG. 6D. FIG. 5 shows the schematic structural diagram of the optical imaging lens assembly according to Embodiment 3 of the present disclosure.

As shown in FIG. 5, the optical imaging lens assembly sequentially includes, along the optical axis from the object side to the image side, a diaphragm STO, a first lens E1, a second lens E2, a third lens E3, a fourth lens E4, a fifth lens E5, a sixth lens E6, a seventh lens E7, an eighth lens E8, an optical filter E9 and an image plane E19.

The first lens E1 has a positive refractive power, the object-side surface S1 thereof is a convex surface, and the image-side surface S2 thereof is a concave surface. The second lens E2 has a negative refractive power, the object-side surface S3 thereof is a convex surface, and the image-side surface S4 thereof is a concave surface. The third lens E3 has a positive refractive power, the object-side surface S5 thereof is a convex surface, and the image-side surface S6 thereof is a concave surface. The fourth lens E4 has a negative refractive power, the object-side surface S7 thereof is a concave surface, and the image-side surface S8 thereof is a convex surface. The fifth lens E5 has a negative refractive power, the object-side surface S9 thereof is a convex surface, and the image-side surface S10 thereof is a concave surface. The sixth lens E6 has a positive refractive power, the object-side surface S11 thereof is a convex surface, and the image-side surface S12 thereof is a convex surface. The seventh lens E7 has a positive refractive power, the object-side surface S13 thereof is a convex surface, and the image-side surface S14 thereof is a concave surface. The eighth lens E8 has a negative refractive power, the object-side surface S15 thereof is a concave surface, and the image-side surface S16 thereof is a concave surface. The optical filter E9 has the object-side surface S17 and the image-side surface S18. The light from an object sequentially passes through the respective surfaces S1 to S18 and is finally imaged on the image plane S19.

In the present embodiment, the total effective focal length f of the optical imaging lens assembly is 6.64 mm, the axial distance TTL from the object-side surface S1 of the first lens E1 to the image plane S19 is 8.06 mm, half the diagonal length ImgH of the effective pixel area on the image plane S19 is 6.00 mm, half of a maximal field-of-view Semi-FOV of the optical imaging lens assembly is 41.3°, and the aperture value Fno of the optical imaging lens assembly is 1.73.

Table 5 below is a table illustrating basic parameters of the optical imaging lens assembly of Embodiment 3, where the units for the radius of curvature, the thickness/distance and the focal length are millimeter (mm).

TABLE 5

| Surface Number | Surface Type | Radius of Curvature | Thickness/Distance | Refractive Index | Abbe Number | Focal Length | Conic Coefficient |
|---|---|---|---|---|---|---|---|
| OBJ | spherical | Infinite | Infinite | | | | |
| STO | spherical | Infinite | −0.7574 | | | | |
| S1 | aspheric | 2.8196 | 0.9018 | 1.55 | 56.1 | 6.33 | 0.0132 |
| S2 | aspheric | 13.5541 | 0.2183 | | | | 7.6455 |
| S3 | aspheric | 5.6379 | 0.2685 | 1.68 | 19.2 | −13.91 | 0.8075 |
| S4 | aspheric | 3.4597 | 0.3112 | | | | 0.1515 |
| S5 | aspheric | 12.0742 | 0.3796 | 1.55 | 56.1 | 32.67 | −29.8677 |
| S6 | aspheric | 36.9529 | 0.3371 | | | | 99.0000 |
| S7 | aspheric | −13.0223 | 0.5719 | 1.57 | 37.3 | −499.66 | 47.5405 |
| S8 | aspheric | −13.8634 | 0.1141 | | | | 9.3699 |
| S9 | aspheric | 31.0464 | 0.3000 | 1.68 | 19.2 | −150.03 | −34.4981 |
| S10 | aspheric | 23.6901 | 0.5080 | | | | −29.4825 |
| S11 | aspheric | 136.2181 | 0.4302 | 1.57 | 37.3 | 104.01 | −99.0000 |
| S12 | aspheric | −104.9822 | 0.5079 | | | | 99.0000 |
| S13 | aspheric | 3.7096 | 0.6950 | 1.55 | 56.1 | 6.92 | −11.2195 |
| S14 | aspheric | 187.8586 | 0.9754 | | | | −99.0000 |
| S15 | aspheric | −3.5809 | 0.5102 | 1.54 | 55.7 | −4.19 | −2.4427 |
| S16 | aspheric | 6.3477 | 0.1807 | | | | 0.0464 |
| S17 | spherical | Infinite | 0.2100 | 1.52 | 64.2 | | |
| S18 | spherical | Infinite | 0.6400 | | | | |
| S19 | spherical | Infinite | | | | | |

In Embodiment 3, the aspheric lens may be used for both of the object-side surface and image-side surface of any one of the first lens E1 to the eighth lens E8. Table 6 below shows the high-order coefficients A4, A6, A8, A10, A12, A14, A16, A18 and A20 applicable to the aspheric surfaces S1-S16 of the aspheric lenses in the present embodiment.

TABLE 6

| Surface Number | A4 | A6 | A8 | A10 | A12 | A14 | A16 | A18 | A20 |
|---|---|---|---|---|---|---|---|---|---|
| S1 | 5.1292E−04 | 4.4603E−04 | −7.6095E−04 | 9.4688E−04 | −6.9795E−04 | 3.1350E−04 | −8.4261E−05 | 1.2425E−05 | −7.8012E−07 |
| S2 | −5.6335E−03 | 2.4872E−03 | 1.2071E−03 | −2.8972E−03 | 2.3481E−03 | −1.0841E−03 | 2.9575E−04 | −4.4327E−05 | 2.8113E−06 |
| S3 | −2.5326E−02 | 1.0815E−02 | 2.3647E−03 | −4.7995E−03 | 4.4733E−03 | −2.2827E−03 | 6.9123E−04 | −1.1555E−04 | 8.2060E−06 |
| S4 | −2.0405E−02 | 1.0249E−02 | −1.3210E−03 | −5.9998E−04 | −5.0323E−04 | 1.2566E−03 | −8.1052E−04 | 2.3676E−04 | −2.6932E−05 |
| S5 | 1.1735E−03 | −5.8370E−03 | 1.4116E−02 | −2.0971E−02 | 1.9013E−02 | −1.0486E−02 | 3.4917E−03 | −6.4039E−04 | 4.9953E−05 |
| S6 | −3.7594E−03 | −2.1243E−03 | 5.3310E−04 | −7.8545E−04 | 1.0417E−03 | −8.5956E−04 | 4.6268E−04 | −1.3051E−04 | 1.4727E−05 |
| S7 | −7.5795E−03 | −1.4161E−02 | 2.2159E−02 | −3.0640E−02 | 2.5305E−02 | −1.3155E−02 | 4.1488E−03 | −7.1379E−04 | 4.9274E−05 |
| S8 | 2.9239E−03 | −6.2418E−02 | 7.9588E−02 | −6.6445E−02 | 3.5952E−02 | −1.2804E−02 | 2.9353E−03 | −3.9521E−04 | 2.3744E−05 |
| S9 | 4.3863E−03 | −7.9288E−02 | 8.0683E−02 | −5.0028E−02 | 1.9589E−02 | −4.7332E−03 | 6.7515E−04 | −5.0568E−05 | 1.4263E−06 |
| S10 | 3.5739E−03 | −4.4858E−02 | 3.7281E−02 | −1.9311E−02 | 6.5582E−03 | −1.4349E−03 | 1.9342E−04 | −1.4354E−05 | 4.3615E−07 |
| S11 | −8.4502E−03 | 7.0320E−04 | −4.9251E−04 | 3.9195E−04 | −1.9933E−04 | 5.1897E−05 | −7.6630E−06 | 6.2440E−07 | −2.1539E−08 |
| S12 | −4.4186E−02 | 1.4689E−02 | −4.5014E−03 | 1.3756E−03 | −3.2765E−04 | 4.9515E−05 | −4.2704E−06 | 1.8584E−07 | −2.9756E−09 |

TABLE 6-continued

| Surface Number | A4 | A6 | A8 | A10 | A12 | A14 | A16 | A18 | A20 |
|---|---|---|---|---|---|---|---|---|---|
| S13 | 5.6210E−03 | −6.7797E−03 | 1.7687E−03 | −4.5570E−04 | 8.7738E−05 | −1.1397E−05 | 9.3806E−07 | −4.2958E−08 | 8.1851E−10 |
| S14 | 2.4848E−02 | −8.3790E−03 | 1.0626E−03 | −5.9914E−05 | −3.3812E−06 | 9.6077E−07 | −7.8323E−08 | 2.9578E−09 | −4.3581E−11 |
| S15 | −9.1119E−03 | 8.7905E−04 | 1.7877E−04 | −3.6596E−05 | 2.9783E−06 | −1.3598E−07 | 3.6548E−09 | −5.4228E−11 | 3.4343E−13 |
| S16 | −2.2400E−02 | 3.6766E−03 | −5.2183E−04 | 5.2495E−05 | −3.5446E−06 | 1.5400E−07 | −4.0989E−09 | 6.0855E−11 | −3.8796E−13 |

Figure 6A:
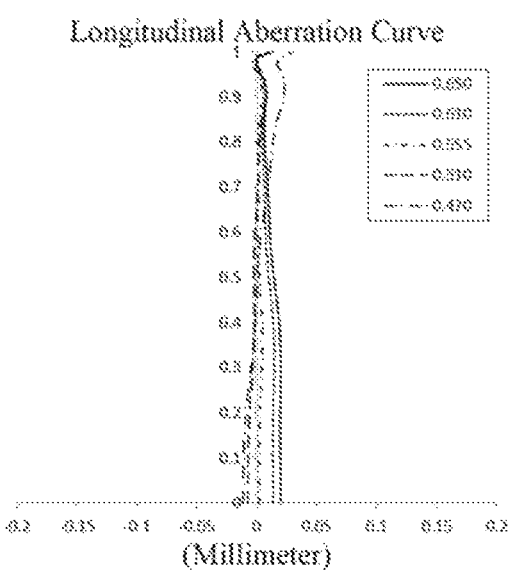
FIGS. 6A-6D respectively illustrate a longitudinal aberration curve, an astigmatic curve, a distortion curve and a lateral color curve of the imaging lens assembly according to Embodiment 3.
Figure 6B:
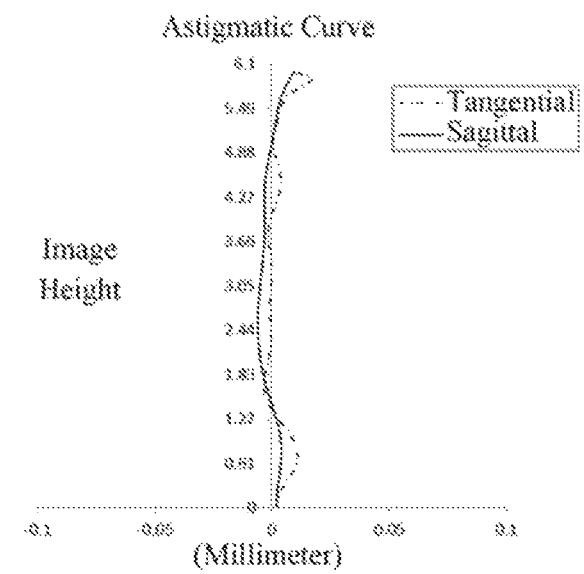
Figures 6C, 6D:
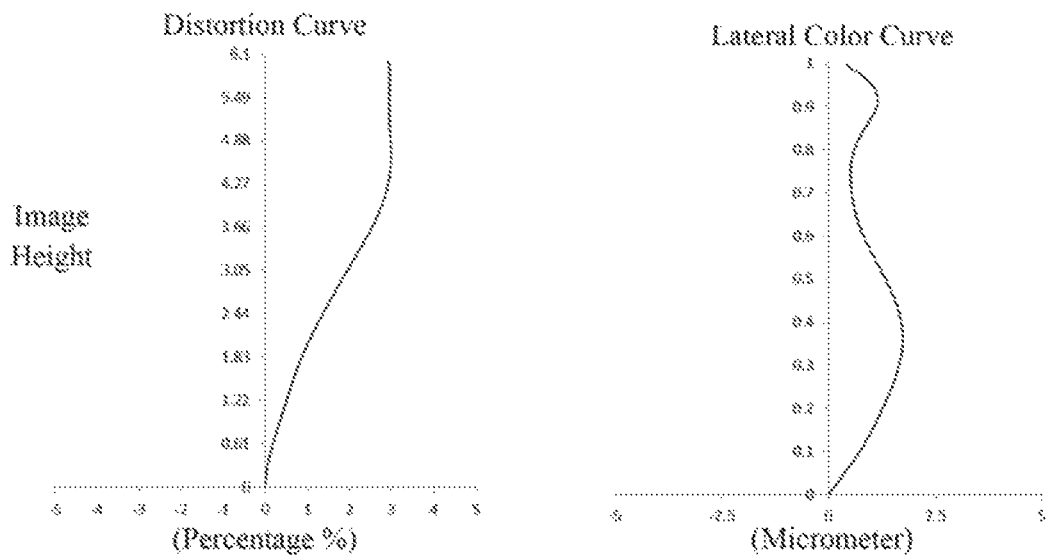

FIG. 6A illustrates a longitudinal aberration curve of the optical imaging system according to Embodiment 3, representing deviations of focal points converged by light of different wavelengths after passing through the optical imaging system. FIG. 6B illustrates an astigmatic curve of the optical imaging system according to Embodiment 3, representing a curvature of a tangential plane and a curvature of a sagittal plane. FIG. 6C illustrates a distortion curve of the optical imaging system according to Embodiment 3, representing amounts of distortion at different image heights. FIG. 6D illustrates a lateral color curve of the optical imaging system according to Embodiment 3, representing deviations of different image heights on the imaging plane after light passes through the optical imaging system. It can be seen from FIG. 6A to FIG. 6D that the optical imaging lens assembly provided in Embodiment 3 may achieve good imaging quality.

Embodiment 4

Figure 7:
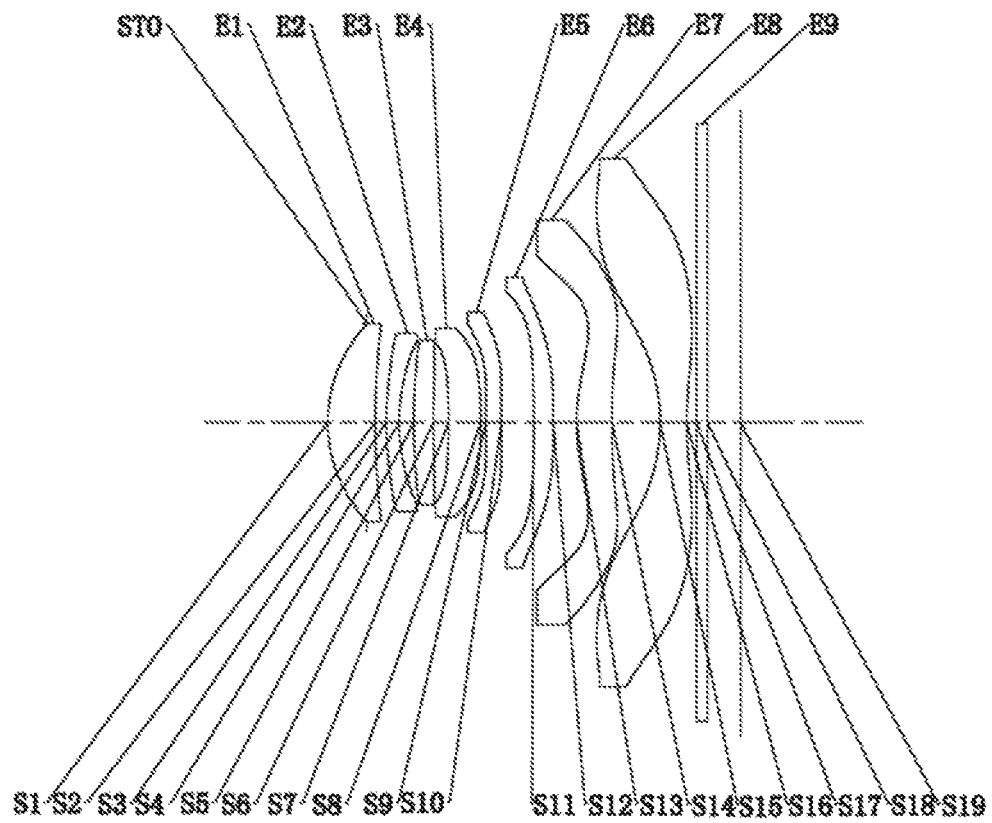
FIG. 7 is a schematic structural diagram illustrating an imaging lens assembly according to Embodiment 4.

An imaging lens assembly according to Embodiment 4 of the present disclosure is described with reference to FIG. 7 to FIG. 8D. FIG. 7 shows the schematic structural diagram of the optical imaging lens assembly according to Embodiment 4 of the present disclosure.

As shown in FIG. 7, the optical imaging lens assembly sequentially includes, along the optical axis from the object side to the image side, a diaphragm STO, a first lens E1, a second lens E2, a third lens E3, a fourth lens E4, a fifth lens E5, a sixth lens E6, a seventh lens E7, an eighth lens E8, an optical filter E9 and an image plane E19.

The first lens E1 has a positive refractive power, the object-side surface S1 thereof is a convex surface, and the image-side surface S2 thereof is a concave surface. The second lens E2 has a negative refractive power, the object-side surface S3 thereof is a convex surface, and the image-side surface S4 thereof is a concave surface. The third lens E3 has a positive refractive power, the object-side surface S5 thereof is a convex surface, and the image-side surface S6 thereof is a concave surface. The fourth lens E4 has a positive refractive power, the object-side surface S7 thereof is a concave surface, and the image-side surface S8 thereof is a convex surface. The fifth lens E5 has a positive refractive power, the object-side surface S9 thereof is a convex surface, and the image-side surface S10 thereof is a concave surface. The sixth lens E6 has a negative refractive power, the object-side surface S11 thereof is a concave surface, and the image-side surface S12 thereof is a convex surface. The seventh lens E7 has a positive refractive power, the object-side surface S13 thereof is a convex surface, and the image-side surface S14 thereof is a concave surface. The eighth lens E8 has a negative refractive power, the object-side surface S15 thereof is a concave surface, and the image-side surface S16 thereof is a concave surface. The optical filter E9 has the object-side surface S17 and the image-side surface S18. The light from an object sequentially passes through the respective surfaces S1 to S18 and is finally imaged on the image plane S19.

In the present embodiment, the total effective focal length f of the optical imaging lens assembly is 6.67 mm, the axial distance TTL from the object-side surface S1 of the first lens E1 to the image plane S19 is 8.04 mm, half the diagonal length ImgH of the effective pixel area on the image plane S19 is 6.10 mm, half of a maximal field-of-view Semi-FOV of the optical imaging lens assembly is 41.9°, and the aperture value Fno of the optical imaging lens assembly is 1.73.

Table 7 below is a table illustrating basic parameters of the optical imaging lens assembly of Embodiment 4, where the units for the radius of curvature, the thickness/distance and the focal length are millimeter (mm).

TABLE 7

| Surface Number | Surface Type | Radius of Curvature | Thickness/ Distance | Material Refractive Index | Abbe Number | Focal Length | Conic Coefficient |
|---|---|---|---|---|---|---|---|
| OBJ | spherical | Infinite | Infinite | | | | |
| STO | spherical | Infinite | −0.7602 | | | | |
| S1 | aspheric | 2.8179 | 0.9235 | 1.55 | 56.1 | 6.34 | −0.0025 |
| S2 | aspheric | 13.3900 | 0.2156 | | | | 3.9278 |
| S3 | aspheric | 5.8996 | 0.2500 | 1.68 | 19.2 | −14.02 | 0.4606 |
| S4 | aspheric | 3.5774 | 0.2863 | | | | 0.1076 |
| S5 | aspheric | 11.7999 | 0.3816 | 1.55 | 56.1 | 41.35 | −33.0153 |
| S6 | aspheric | 24.4386 | 0.2969 | | | | 40.9491 |
| S7 | aspheric | −15.6866 | 0.6245 | 1.57 | 37.3 | 75.32 | 49.9619 |
| S8 | aspheric | −11.6571 | 0.1013 | | | | 5.3392 |
| S9 | aspheric | 53.9045 | 0.3000 | 1.68 | 19.2 | 499.53 | −99.0000 |
| S10 | aspheric | 63.9714 | 0.6292 | | | | 99.0000 |
| S11 | aspheric | −65.9064 | 0.3836 | 1.57 | 37.3 | −218.11 | 9.2717 |
| S12 | aspheric | −140.4483 | 0.4526 | | | | −99.0000 |
| S13 | aspheric | 3.7045 | 0.6950 | 1.55 | 56.1 | 7.24 | −11.9934 |
| S14 | aspheric | 55.2758 | 0.9354 | | | | 31.8318 |

TABLE 7-continued

| Surface Number | Surface Type | Radius of Curvature | Thickness/ Distance | Material Refractive Index | Abbe Number | Focal Length | Conic Coefficient |
|---|---|---|---|---|---|---|---|
| S15 | aspheric | −3.5785 | 0.5153 | 1.54 | 55.7 | −4.18 | −2.4902 |
| S16 | aspheric | 6.3201 | 0.1953 | | | | 0.0246 |
| S17 | spherical | Infinite | 0.2100 | 1.52 | 64.2 | | |
| S18 | spherical | Infinite | 0.6445 | | | | |
| S19 | spherical | Infinite | | | | | |

In Embodiment 4, the aspheric lens may be used for both of the object-side surface and image-side surface of any one of the first lens E1 to the eighth lens E8. Table 8 below shows the high-order coefficients A4, A6, A8, A10, A12, A14, A16, A18 and A20 applicable to the aspheric surfaces S1-S16 of the aspheric lenses in the present embodiment.

TABLE 8

| Surface Number | A4 | A6 | A8 | A10 | A12 | A14 | A16 | A18 | A20 |
|---|---|---|---|---|---|---|---|---|---|
| S1 | 5.8723E−04 | −1.7870E−04 | 2.7986E−04 | −1.4529E−04 | 1.7595E−05 | 1.6191E−05 | −7.9781E−06 | 1.3621E−06 | −8.3281E−08 |
| S2 | −6.5663E−03 | 3.2758E−03 | −1.4057E−04 | −1.4727E−03 | 1.4472E−03 | −7.3809E−04 | 2.1720E−04 | −3.4754E−05 | 2.3471E−06 |
| S3 | −2.6468E−02 | 1.2743E−02 | −2.9436E−03 | −9.6453E−04 | 1.4068E−03 | −7.5368E−04 | 2.3574E−04 | −4.1644E−05 | 3.2253E−06 |
| S4 | −2.0497E−02 | 1.1580E−02 | −2.3710E−03 | −1.4413E−03 | 1.8327E−03 | −8.7136E−04 | 1.7350E−04 | 7.0225E−06 | −5.5000E−06 |
| S5 | 3.6773E−04 | −2.5261E−03 | 4.4379E−03 | −5.4763E−03 | 4.1383E−03 | −1.7000E−03 | 3.6178E−04 | −1.7000E−05 | −3.8990E−06 |
| S6 | −5.4061E−03 | 1.0791E−05 | −4.3853E−03 | 4.5765E−03 | −2.2436E−03 | 2.8073E−04 | 2.6447E−04 | −1.1451E−04 | 1.3890E−05 |
| S7 | −6.6498E−03 | −1.2864E−02 | 1.6670E−02 | −2.3161E−02 | 1.9350E−02 | −1.0294E−02 | 3.3324E−03 | −5.8690E−04 | 4.1367E−05 |
| S8 | 9.9200E−03 | −7.2634E−02 | 8.8139E−02 | −7.1592E−02 | 3.8523E−02 | −1.3835E−02 | 3.2196E−03 | −4.4081E−04 | 2.6930E−05 |
| S9 | 6.3640E−03 | −7.7531E−02 | 7.2681E−02 | −4.1573E−02 | 1.4852E−02 | −3.1032E−03 | 3.2067E−04 | −5.3277E−06 | −1.1397E−06 |
| S10 | 5.6018E−04 | −3.7161E−02 | 2.7511E−02 | −1.2373E−02 | 3.5560E−03 | −6.0362E−04 | 4.7263E−05 | 6.1920E−07 | −2.4300E−07 |
| S11 | −8.0241E−03 | 1.8631E−03 | −1.7882E−03 | 9.5977E−04 | −3.3261E−04 | 6.8906E−05 | −8.5253E−06 | 5.8882E−07 | −1.7216E−08 |
| S12 | −4.2990E−02 | 1.5497E−02 | −5.2764E−03 | 1.6980E−03 | −4.1931E−04 | 6.7893E−05 | −6.6024E−06 | 3.4808E−07 | −7.6372E−09 |
| S13 | 6.9174E−03 | −8.1324E−03 | 2.3122E−03 | −6.0108E−04 | 1.1263E−04 | −1.4079E−05 | 1.1132E−06 | −4.9067E−08 | 8.9913E−10 |
| S14 | 2.6803E−02 | −9.9623E−03 | 1.5776E−03 | −1.6593E−04 | 1.0733E−05 | −2.2584E−07 | −1.7776E−08 | 1.2460E−09 | −2.2999E−11 |
| S15 | −9.0025E−03 | 8.8325E−04 | 1.7604E−04 | −3.6327E−05 | 2.9675E−06 | −1.3589E−07 | 3.6591E−09 | −5.4279E−11 | 3.4247E−13 |
| S16 | −2.4467E−02 | 4.4921E−03 | −7.3142E−04 | 8.4201E−05 | −6.3790E−06 | 3.0628E−07 | −8.9390E−09 | 1.4485E−10 | −1.0021E−12 |

Figure 8A:
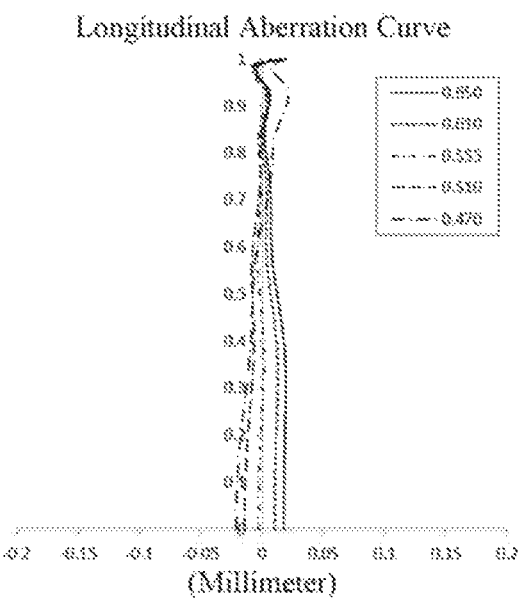
FIGS. 8A-8D respectively illustrate a longitudinal aberration curve, an astigmatic curve, a distortion curve and a lateral color curve of the imaging lens assembly according to Embodiment 4.
Figure 8B:
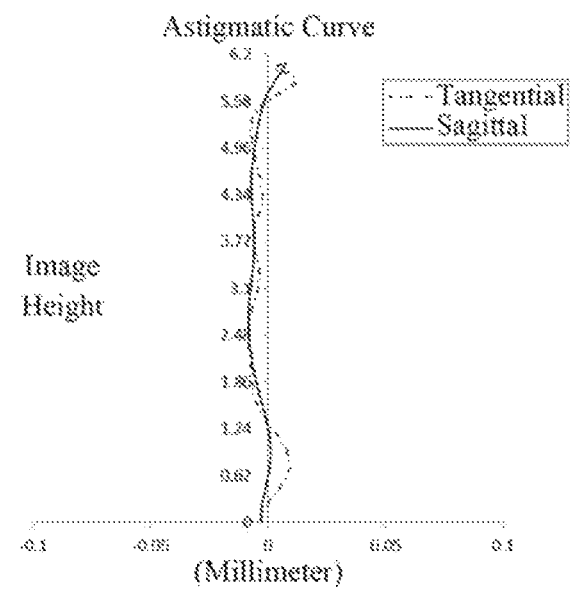
Figure 8C:
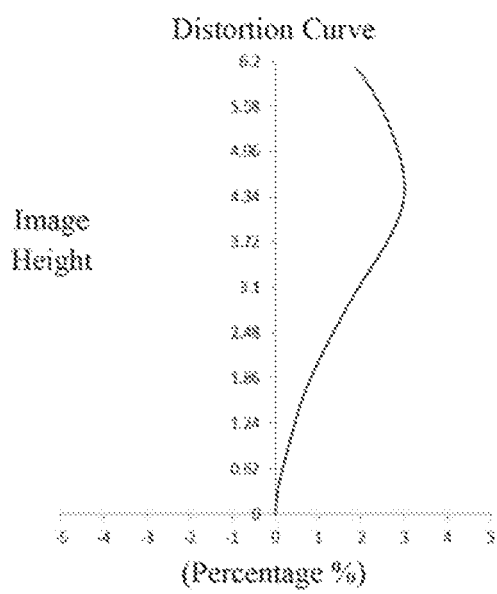
Figure 8D:
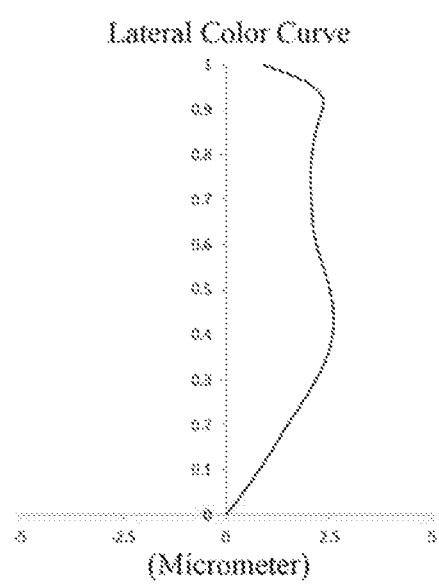

FIG. 8A illustrates a longitudinal aberration curve of the optical imaging system according to Embodiment 4, representing deviations of focal points converged by light of different wavelengths after passing through the optical imaging system. FIG. 8B illustrates an astigmatic curve of the optical imaging system according to Embodiment 4, representing a curvature of a tangential plane and a curvature of a sagittal plane. FIG. 8C illustrates a distortion curve of the optical imaging system according to Embodiment 4, representing amounts of distortion at different image heights. FIG. 8D illustrates a lateral color curve of the optical imaging system according to Embodiment 4, representing deviations of different image heights on the imaging plane after light passes through the optical imaging system. It can be seen from FIG. 8A to FIG. 8D that the optical imaging lens assembly provided in Embodiment 4 may achieve good imaging quality.

Embodiment 5

Figure 9:
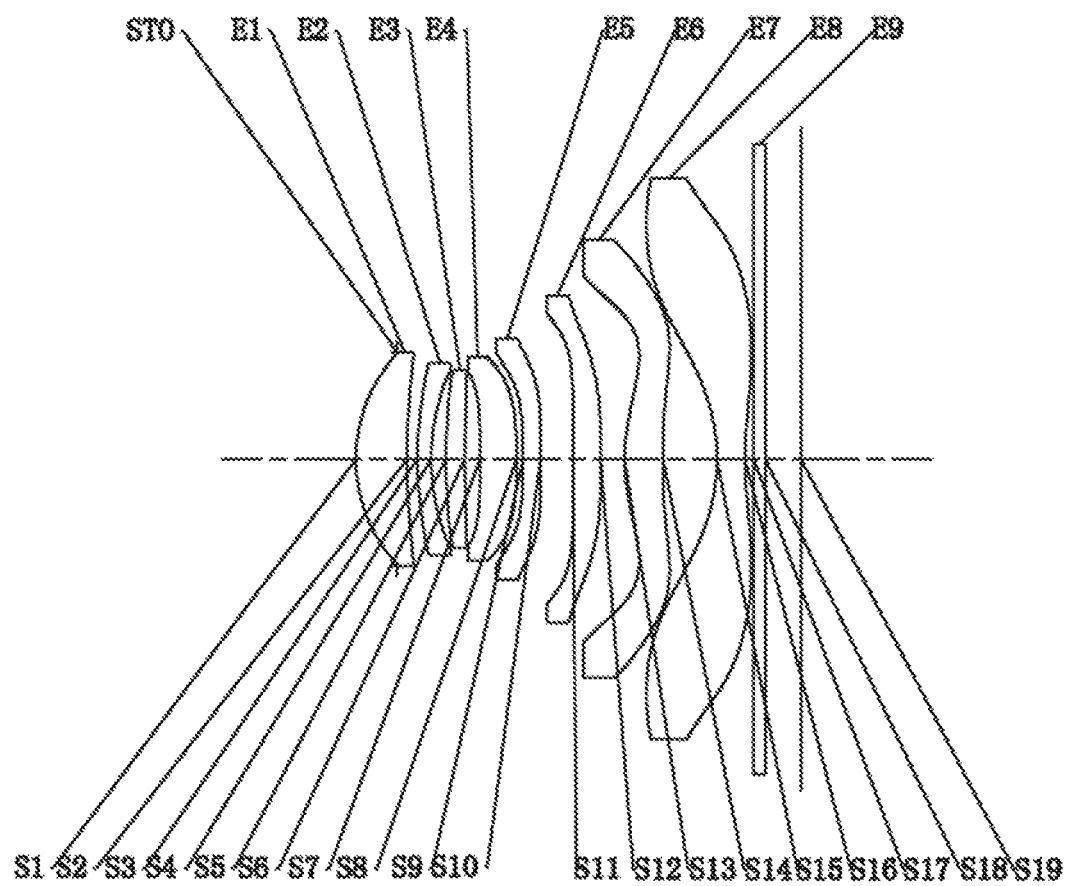
FIG. 9 is a schematic structural diagram illustrating an imaging lens assembly according to Embodiment 5.

An imaging lens assembly according to Embodiment 5 of the present disclosure is described with reference to FIG. 9 to FIG. 10D. FIG. 9 shows the schematic structural diagram of the optical imaging lens assembly according to Embodiment 5 of the present disclosure.

As shown in FIG. 9, the optical imaging lens assembly sequentially includes, along the optical axis from the object side to the image side, a diaphragm STO, a first lens E1, a second lens E2, a third lens E3, a fourth lens E4, a fifth lens E5, a sixth lens E6, a seventh lens E7, an eighth lens E8, an optical filter E9 and an image plane E19.

The first lens E1 has a positive refractive power, the object-side surface S1 thereof is a convex surface, and the image-side surface S2 thereof is a concave surface. The second lens E2 has a negative refractive power, the object-side surface S3 thereof is a convex surface, and the image-side surface S4 thereof is a concave surface. The third lens E3 has a positive refractive power, the object-side surface S5 thereof is a convex surface, and the image-side surface S6 thereof is a concave surface. The fourth lens E4 has a positive refractive power, the object-side surface S7 thereof is a concave surface, and the image-side surface S8 thereof is a convex surface. The fifth lens E5 has a negative refractive power, the object-side surface S9 thereof is a concave surface, and the image-side surface S10 thereof is a convex surface. The sixth lens E6 has a negative refractive power, the object-side surface S11 thereof is a convex surface, and the image-side surface S12 thereof is a concave surface. The seventh lens E7 has a positive refractive power, the object-side surface S13 thereof is a convex surface, and the image-side surface S14 thereof is a concave surface. The eighth lens E8 has a negative refractive power, the object-side surface S15 thereof is a concave surface, and the image-side surface S16 thereof is a concave surface. The optical filter E9 has the object-side surface S17 and the image-side surface S18. The light from an object sequentially passes through the respective surfaces S1 to S18 and is finally imaged on the image plane S19.

In the present embodiment, the total effective focal length f of the optical imaging lens assembly is 6.53 mm, the axial distance TTL from the object-side surface S1 of the first lens E1 to the image plane S19 is 8.04 mm, half the diagonal length ImgH of the effective pixel area on the image plane S19 is 6.00 mm, half of a maximal field-of-view Semi-FOV of the optical imaging lens assembly is 41.8°, and the aperture value Fno of the optical imaging lens assembly is 1.69.

Table 9 below is a table illustrating basic parameters of the optical imaging lens assembly of Embodiment 5, where the units for the radius of curvature, the thickness/distance and the focal length are millimeter (mm).

TABLE 9

| Surface Number | Surface Type | Radius of Curvature | Thickness/ Distance | Material Refractive Index | Abbe Number | Focal Length | Conic Coefficient |
|---|---|---|---|---|---|---|---|
| OBJ | spherical | Infinite | Infinite | | | | |
| STO | spherical | Infinite | −0.7421 | | | | |
| S1 | aspheric | 2.8520 | 0.9238 | 1.55 | 56.1 | 6.59 | 0.0000 |
| S2 | aspheric | 12.1780 | 0.1866 | | | | 0.0000 |
| S3 | aspheric | 5.6774 | 0.2500 | 1.68 | 19.2 | −16.32 | 0.0000 |
| S4 | aspheric | 3.6850 | 0.2681 | | | | 0.0000 |
| S5 | aspheric | 10.7362 | 0.3397 | 1.55 | 56.1 | 52.46 | −35.2643 |
| S6 | aspheric | 16.9816 | 0.2794 | | | | 0.0000 |
| S7 | aspheric | −21.9602 | 0.6596 | 1.57 | 37.3 | 22.57 | 0.0000 |
| S8 | aspheric | −8.2042 | 0.1119 | | | | 0.0000 |
| S9 | aspheric | −17.1704 | 0.3181 | 1.68 | 19.2 | −27.46 | 0.0000 |
| S10 | aspheric | −224.3568 | 0.5860 | | | | 0.0000 |
| S11 | aspheric | 70.8174 | 0.5000 | 1.57 | 37.3 | −499.57 | 0.0000 |
| S12 | aspheric | 56.5754 | 0.4323 | | | | 0.0000 |
| S13 | aspheric | 3.3549 | 0.6950 | 1.55 | 56.1 | 6.68 | −10.1935 |
| S14 | aspheric | 38.8507 | 0.9767 | | | | 0.0000 |
| S15 | aspheric | −3.6014 | 0.5052 | 1.54 | 55.7 | −4.14 | −2.2778 |
| S16 | aspheric | 6.0924 | 0.1576 | | | | 0.0000 |
| S17 | spherical | Infinite | 0.2100 | 1.52 | 64.2 | | |
| S18 | spherical | Infinite | 0.6438 | | | | |
| S19 | spherical | Infinite | | | | | |

In Embodiment 5, the aspheric lens may be used for both of the object-side surface and image-side surface of any one of the first lens E1 to the eighth lens E8. Table 10 below shows the high-order coefficients A4, A6, A8, A10, A12, A14, A16, A18 and A20 applicable to the aspheric surfaces S1-S16 of the aspheric lenses in the present embodiment.

TABLE 10

| Surface Number | A4 | A6 | A8 | A10 | A12 | A14 | A16 | A18 | A20 |
|---|---|---|---|---|---|---|---|---|---|
| S1 | 5.7497E−04 | 1.4003E−04 | −1.3795E−05 | 6.8349E−06 | −3.5230E−06 | 1.2634E−06 | −3.1263E−07 | 0.0000E+00 | 0.0000E+00 |
| S2 | −6.8698E−03 | 4.5026E−03 | −2.1725E−03 | 7.2742E−04 | −1.4916E−04 | 1.3192E−05 | 0.0000E+00 | 0.0000E+00 | 0.0000E+00 |
| S3 | −2.3347E−02 | 1.0847E−02 | −2.8434E−03 | 6.6420E−05 | 2.6099E−04 | −8.7151E−05 | 1.0187E−05 | 0.0000E+00 | 0.0000E+00 |
| S4 | −1.7689E−02 | 1.0922E−02 | −5.3569E−03 | 3.1533E−03 | −1.4921E−03 | 4.0639E−04 | −3.6720E−05 | −2.3346E−06 | 0.0000E+00 |
| S5 | 5.7878E−04 | −4.0609E−03 | 9.4945E−03 | −1.5250E−02 | 1.5469E−02 | −9.6211E−03 | 3.6372E−03 | −7.5620E−04 | 6.6218E−05 |
| S6 | −5.0896E−03 | −2.4613E−03 | 2.1490E−04 | −1.7633E−04 | 6.6295E−04 | −6.3057E−04 | 3.2490E−04 | −7.5412E−05 | 6.1102E−06 |
| S7 | −7.7614E−03 | −1.0186E−02 | 8.1059E−03 | −8.3873E−03 | 4.1834E−03 | −6.8108E−04 | −3.3769E−04 | 1.8545E−04 | −2.7372E−05 |
| S8 | 1.2285E−02 | −6.0786E−02 | 6.5698E−02 | −5.1861E−02 | 2.8168E−02 | −1.0454E−02 | 2.5688E−03 | −3.7825E−04 | 2.5158E−05 |
| S9 | 3.9612E−03 | −6.5909E−02 | 5.4308E−02 | −2.5495E−02 | 5.4814E−03 | 6.7860E−04 | −6.7261E−04 | 1.4339E−04 | −1.0608E−05 |
| S10 | −4.6436E−03 | −3.1287E−02 | 2.3583E−02 | −1.0790E−02 | 3.2197E−03 | −5.7634E−04 | 4.8185E−05 | 4.4632E−07 | −2.4404E−07 |
| S11 | −7.3980E−03 | 2.6245E−03 | −1.7482E−03 | 5.8758E−04 | −1.5363E−04 | 2.8100E−05 | −3.3053E−06 | 2.2529E−07 | −6.5427E−09 |
| S12 | −4.5729E−02 | 1.7118E−02 | −5.1790E−03 | 1.2917E−03 | −2.6078E−04 | 3.7926E−05 | −3.4701E−06 | 1.7423E−07 | −3.6334E−09 |
| S13 | 6.3442E−03 | −6.8031E−03 | 1.8064E−03 | −5.1248E−04 | 1.0540E−04 | −1.3974E−05 | 1.1397E−06 | −5.1153E−08 | 9.5468E−10 |
| S14 | 2.6261E−02 | −8.8324E−03 | 1.0994E−03 | −6.6372E−05 | −1.1468E−06 | 6.0524E−07 | −5.0222E−08 | 1.8484E−09 | −2.6069E−11 |
| S15 | −9.3812E−03 | 1.3277E−03 | 4.4167E−05 | −1.7709E−05 | 1.4797E−06 | −6.4505E−08 | 1.6170E−09 | −2.2168E−11 | 1.2909E−13 |
| S16 | −2.3709E−02 | 4.2203E−03 | −6.5135E−04 | 7.0225E−05 | −4.9823E−06 | 2.2395E−07 | −6.1058E−09 | 9.2193E−11 | −5.9357E−13 |

Figures 10A, 10B:
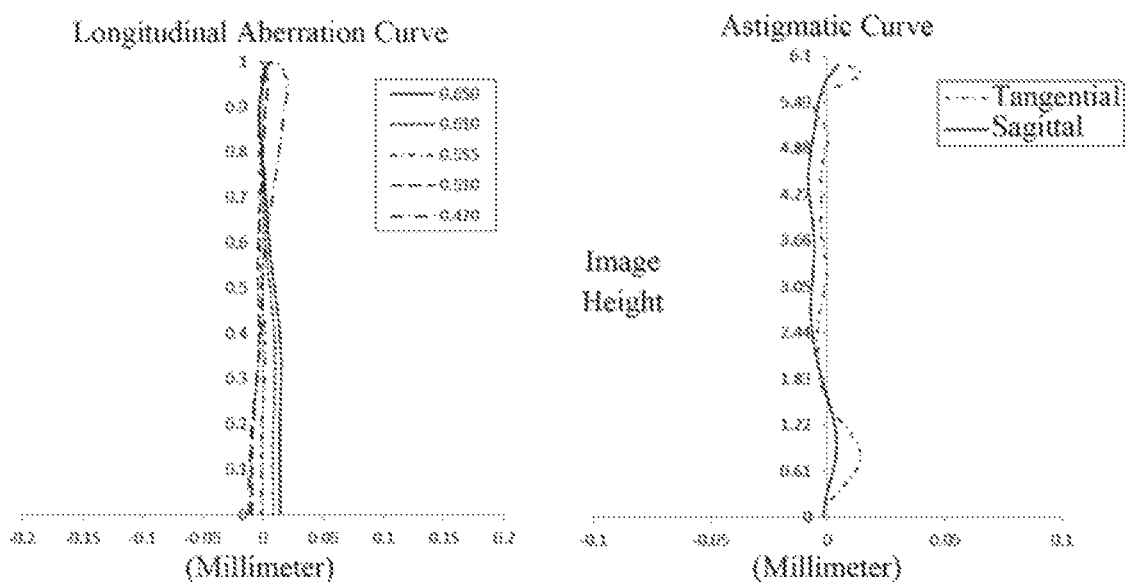
FIGS. 10A-10D respectively illustrate a longitudinal aberration curve, an astigmatic curve, a distortion curve and a lateral color curve of the imaging lens assembly according to Embodiment 5.
Figures 10C, 10D:
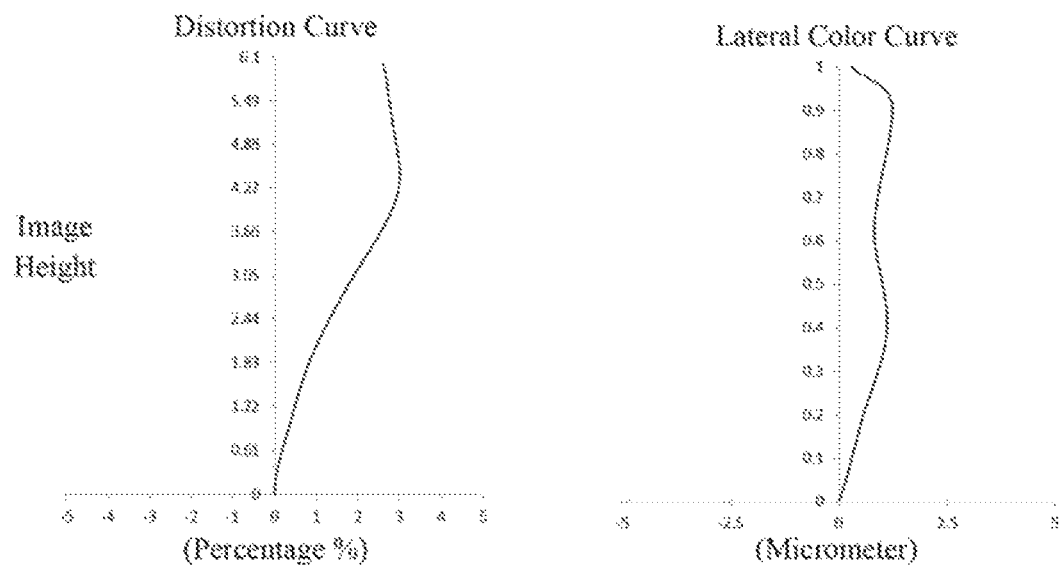

FIG. 10A illustrates a longitudinal aberration curve of the optical imaging system according to Embodiment 5, representing deviations of focal points converged by light of different wavelengths after passing through the optical imaging system. FIG. 10B illustrates an astigmatic curve of the optical imaging system according to Embodiment 5, representing a curvature of a tangential plane and a curvature of a sagittal plane. FIG. 10C illustrates a distortion curve of the optical imaging system according to Embodiment 5, representing amounts of distortion at different image heights. FIG. 10D illustrates a lateral color curve of the optical imaging system according to Embodiment 5, representing deviations of different image heights on the imaging plane after light passes through the optical imaging system. It can be seen from FIG. 10A to FIG. 10D that the optical imaging lens assembly provided in Embodiment 5 may achieve good imaging quality.

Embodiment 6

Figure 11:
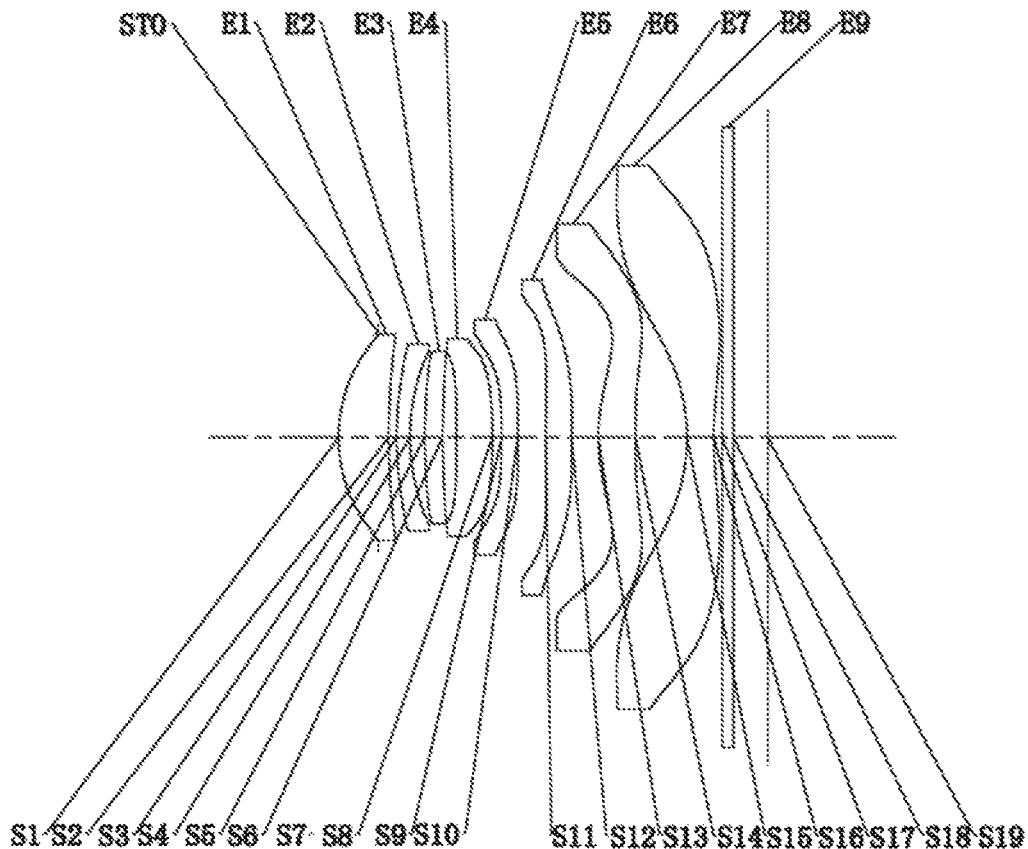
FIG. 11 is a schematic structural diagram illustrating an imaging lens assembly according to Embodiment 6.

An imaging lens assembly according to Embodiment 6 of the present disclosure is described with reference to FIG. 11 to FIG. 12D. FIG. 11 shows the schematic structural diagram of the optical imaging lens assembly according to Embodiment 6 of the present disclosure.

As shown in FIG. 11, the optical imaging lens assembly sequentially includes, along the optical axis from the object side to the image side, a diaphragm STO, a first lens E1, a second lens E2, a third lens E3, a fourth lens E4, a fifth lens E5, a sixth lens E6, a seventh lens E7, an eighth lens E8, an optical filter E9 and an image plane E19.

The first lens E1 has a positive refractive power, the object-side surface S1 thereof is a convex surface, and the image-side surface S2 thereof is a concave surface. The second lens E2 has a negative refractive power, the object-side surface S3 thereof is a convex surface, and the image-side surface S4 thereof is a concave surface. The third lens E3 has a positive refractive power, the object-side surface S5 thereof is a convex surface, and the image-side surface S6 thereof is a concave surface. The fourth lens E4 has a positive refractive power, the object-side surface S7 thereof is a convex surface, and the image-side surface S8 thereof is a convex surface. The fifth lens E5 has a negative refractive power, the object-side surface S9 thereof is a concave surface, and the image-side surface S10 thereof is a convex surface. The sixth lens E6 has a positive refractive power, the object-side surface S11 thereof is a convex surface, and the image-side surface S12 thereof is a concave surface. The seventh lens E7 has a positive refractive power, the object-side surface S13 thereof is a convex surface, and the image-side surface S14 thereof is a concave surface. The eighth lens E8 has a negative refractive power, the object-side surface S15 thereof is a concave surface, and the image-side surface S16 thereof is a concave surface. The optical filter E9 has the object-side surface S17 and the image-side surface S18. The light from an object sequentially passes through the respective surfaces S1 to S18 and is finally imaged on the image plane S19.

In the present embodiment, the total effective focal length f of the optical imaging lens assembly is 6.55 mm, the axial distance TTL from the object-side surface S1 of the first lens E1 to the image plane S19 is 8.03 mm, half the diagonal length ImgH of the effective pixel area on the image plane S19 is 6.10 mm, half of a maximal field-of-view Semi-FOV of the optical imaging lens assembly is 42.1°, and the aperture value Fno of the optical imaging lens assembly is 1.70.

Table 11 below is a table illustrating basic parameters of the optical imaging lens assembly of Embodiment 6, where the units for the radius of curvature, the thickness/distance and the focal length are millimeter (mm).

TABLE 11

| Surface Number | Surface Type | Radius of Curvature | Thickness/ Distance | Material Refractive Index | Abbe Number | Focal Length | Conic Coefficient |
|---|---|---|---|---|---|---|---|
| OBJ | spherical | Infinite | Infinite | | | | |
| STO | spherical | Infinite | −0.7462 | | | | |
| S1 | aspheric | 2.8330 | 0.9374 | 1.55 | 56.1 | 6.65 | −0.0025 |
| S2 | aspheric | 11.3811 | 0.1479 | | | | −0.7588 |
| S3 | aspheric | 5.5445 | 0.2500 | 1.68 | 19.2 | −17.13 | 0.2860 |
| S4 | aspheric | 3.6837 | 0.2769 | | | | 0.1904 |
| S5 | aspheric | 10.5121 | 0.3344 | 1.55 | 56.1 | 142.27 | −29.5081 |
| S6 | aspheric | 12.0210 | 0.2553 | | | | 0.0000 |
| S7 | aspheric | 550.0000 | 0.6762 | 1.57 | 37.3 | 19.78 | 0.0000 |
| S8 | aspheric | −11.5138 | 0.1756 | | | | 0.0000 |
| S9 | aspheric | −14.8262 | 0.3000 | 1.68 | 19.2 | −25.09 | 0.0000 |
| S10 | aspheric | −117.0183 | 0.5225 | | | | 0.0000 |
| S11 | aspheric | 29.9571 | 0.4898 | 1.57 | 37.3 | 93.30 | 0.0000 |
| S12 | aspheric | 68.1325 | 0.4958 | | | | 0.0000 |
| S13 | aspheric | 3.4423 | 0.6937 | 1.55 | 56.1 | 7.00 | −10.1302 |
| S14 | aspheric | 32.3103 | 0.9653 | | | | 0.0000 |
| S15 | aspheric | −3.6177 | 0.5004 | 1.54 | 55.7 | −4.18 | −2.2805 |
| S16 | aspheric | 6.1990 | 0.1590 | | | | 0.0000 |
| S17 | spherical | Infinite | 0.2100 | 1.52 | 64.2 | | |
| S18 | spherical | Infinite | 0.6433 | | | | |
| S19 | spherical | Infinite | | | | | |

In Embodiment 6, the aspheric lens may be used for both of the object-side surface and image-side surface of any one of the first lens E1 to the eighth lens E8. Table 12 below shows the high-order coefficients A4, A6, A8, A10, A12, A14, A16, A18 and A20 applicable to the aspheric surfaces S1-S16 of the aspheric lenses in the present embodiment.

TABLE 12

| Surface Number | A4 | A6 | A8 | A10 | A12 | A14 | A16 | A18 | A20 |
|---|---|---|---|---|---|---|---|---|---|
| S1 | 2.1484E−04 | 1.5090E−03 | −2.8097E−03 | 3.1981E−03 | −2.1877E−03 | 9.1164E−04 | −2.2648E−04 | 3.0706E−05 | −1.7493E−06 |
| S2 | −9.2518E−03 | 6.0243E−03 | −3.5280E−03 | 1.6793E−03 | −4.7886E−04 | 1.2743E−05 | 3.6735E−05 | −1.0314E−05 | 9.2000E−07 |
| S3 | −2.3214E−02 | 8.8873E−03 | 4.2642E−04 | −4.2701E−03 | 4.0521E−03 | −2.1125E−03 | 6.5074E−04 | −1.1008E−04 | 7.9129E−06 |
| S4 | −1.5177E−02 | 8.4464E−03 | −3.5266E−03 | 1.8498E−03 | −9.6160E−04 | 5.0360E−04 | −2.3234E−04 | 7.0313E−05 | −9.1070E−06 |
| S5 | −2.9146E−04 | −2.7409E−04 | −8.1230E−04 | 3.2162E−03 | −4.2951E−03 | 3.2468E−03 | −1.3730E−03 | 3.1267E−04 | −2.9805E−05 |
| S6 | −6.9282E−03 | −1.2245E−03 | −1.3793E−03 | 3.4335E−03 | −3.3826E−03 | 1.8838E−03 | −5.6150E−04 | 8.3862E−05 | −4.5465E−06 |
| S7 | −9.3580E−03 | −1.2026E−02 | 1.6438E−02 | −2.3778E−02 | 2.1320E−02 | −1.2259E−02 | 4.3103E−03 | −8.3970E−04 | 6.8610E−05 |
| S8 | 2.7670E−03 | −4.1227E−02 | 4.3872E−02 | −3.5788E−02 | 1.9810E−02 | −7.3591E−03 | 1.7774E−03 | −2.5346E−04 | 1.6209E−05 |
| S9 | −1.8453E−03 | −5.2415E−02 | 4.1776E−02 | −2.0409E−02 | 5.5323E−03 | −2.4773E−04 | −2.8951E−04 | 7.6164E−05 | −6.1133E−06 |
| S10 | −4.1990E−03 | −3.0448E−02 | 2.2031E−02 | −9.9984E−03 | 3.1051E−03 | −6.1008E−04 | 6.3976E−05 | −1.9332E−06 | −1.1211E−07 |
| S11 | −1.1396E−02 | 5.8736E−03 | −4.0310E−03 | 1.7174E−03 | −5.3167E−04 | 1.1107E−04 | −1.4733E−05 | 1.1175E−06 | −3.6371E−08 |

TABLE 12-continued

| Surface Number | A4 | A6 | A8 | A10 | A12 | A14 | A16 | A18 | A20 |
|---|---|---|---|---|---|---|---|---|---|
| S12 | −4.5565E−02 | 1.7588E−02 | −5.7639E−03 | 1.6162E−03 | −3.6496E−04 | 5.8037E−05 | −5.7478E−06 | 3.1313E−07 | −7.1461E−09 |
| S13 | 7.6910E−03 | −7.6966E−03 | 1.9994E−03 | −5.5665E−04 | 1.1501E−04 | −1.5331E−05 | 1.2506E−06 | −5.5873E−08 | 1.0346E−09 |
| S14 | 2.6552E−02 | −9.3269E−03 | 1.1625E−03 | −6.3165E−05 | −2.6534E−06 | 7.8557E−07 | −6.2392E−08 | 2.3129E−09 | −3.3639E−11 |
| S15 | −9.1636E−03 | 9.9404E−04 | 1.4372E−04 | −3.1904E−05 | 2.6298E−06 | −1.2096E−07 | 3.2881E−09 | −4.9619E−11 | 3.1991E−13 |
| S16 | −2.3976E−02 | 4.3027E−03 | −6.8345E−04 | 7.8043E−05 | −5.9914E−06 | 2.9662E−07 | −9.0628E−09 | 1.5584E−10 | −1.1574E−12 |

Figure 12A:
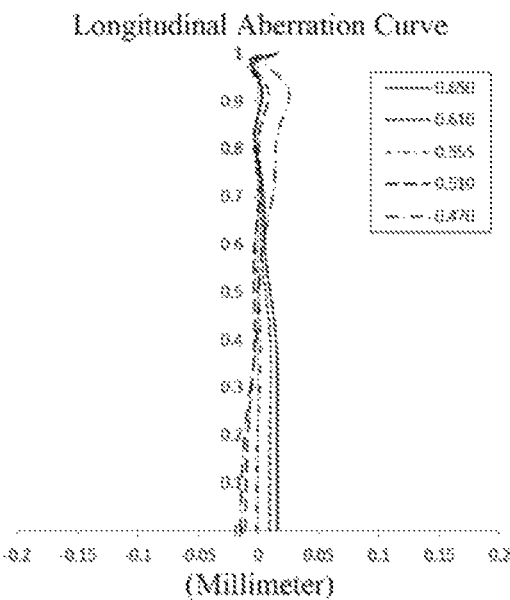
FIGS. 12A-12D respectively illustrate a longitudinal aberration curve, an astigmatic curve, a distortion curve and a lateral color curve of the imaging lens assembly according to Embodiment 6.
Figure 12B:
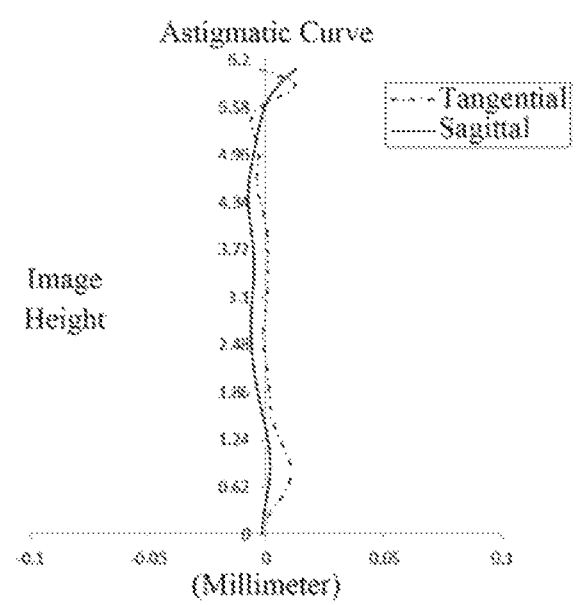
Figure 12C:
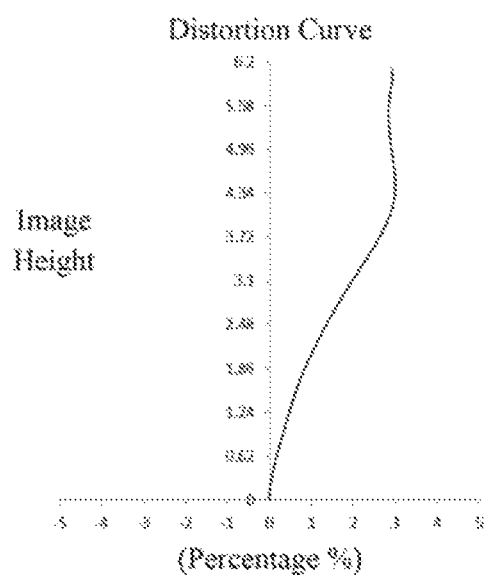
Figure 12D:
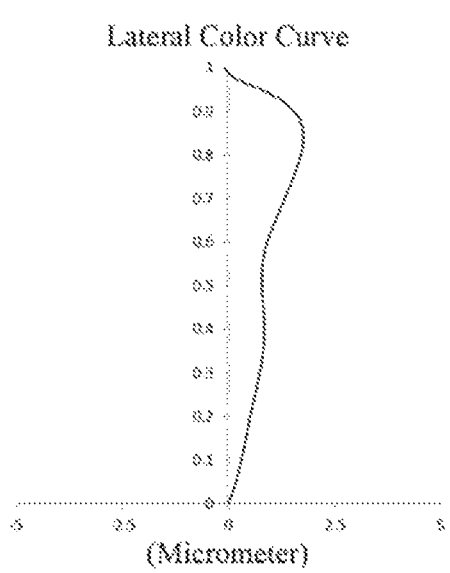

FIG. 12A illustrates a longitudinal aberration curve of the optical imaging system according to Embodiment 6, representing deviations of focal points converged by light of different wavelengths after passing through the optical imaging system. FIG. 12B illustrates an astigmatic curve of the optical imaging system according to Embodiment 6, representing a curvature of a tangential plane and a curvature of a sagittal plane. FIG. 12C illustrates a distortion curve of the optical imaging system according to Embodiment 6, representing amounts of distortion at different image heights. FIG. 12D illustrates a lateral color curve of the optical imaging system according to Embodiment 6, representing deviations of different image heights on the imaging plane after light passes through the optical imaging system. It can be seen from FIG. 12A to FIG. 12D that the optical imaging lens assembly provided in Embodiment 6 may achieve good imaging quality.

Embodiment 7

Figure 13:
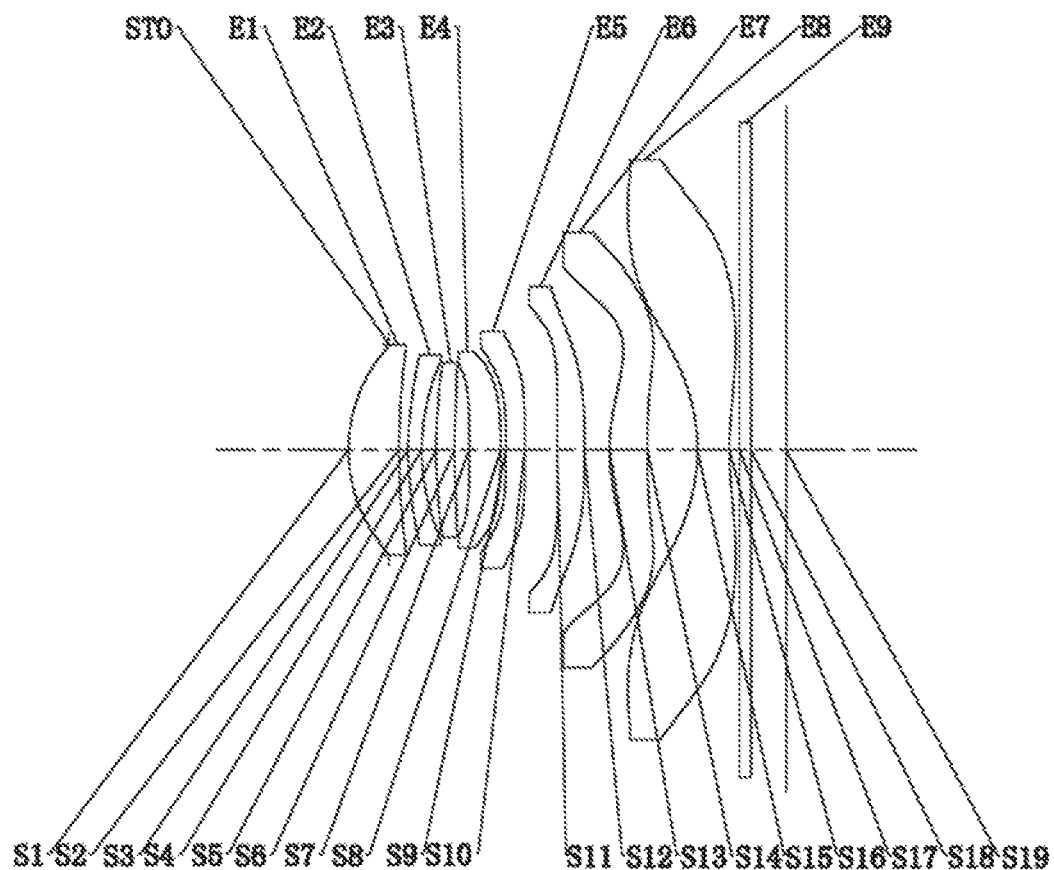
FIG. 13 is a schematic structural diagram illustrating an imaging lens assembly according to Embodiment 7.

An imaging lens assembly according to Embodiment 7 of the present disclosure is described with reference to FIG. 13 to FIG. 14D. FIG. 13 shows the schematic structural diagram of the optical imaging lens assembly according to Embodiment 7 of the present disclosure.

As shown in FIG. 13, the optical imaging lens assembly sequentially includes, along the optical axis from the object side to the image side, a diaphragm STO, a first lens E1, a second lens E2, a third lens E3, a fourth lens E4, a fifth lens E5, a sixth lens E6, a seventh lens E7, an eighth lens E8, an optical filter E9 and an image plane E19.

The first lens E1 has a positive refractive power, the object-side surface S1 thereof is a convex surface, and the image-side surface S2 thereof is a concave surface. The second lens E2 has a negative refractive power, the object-side surface S3 thereof is a convex surface, and the image-side surface S4 thereof is a concave surface. The third lens E3 has a positive refractive power, the object-side surface S5 thereof is a convex surface, and the image-side surface S6 thereof is a concave surface. The fourth lens E4 has a positive refractive power, the object-side surface S7 thereof is a concave surface, and the image-side surface S8 thereof is a convex surface. The fifth lens E5 has a negative refractive power, the object-side surface S9 thereof is a concave surface, and the image-side surface S10 thereof is a concave surface. The sixth lens E6 has a positive refractive power, the object-side surface S11 thereof is a convex surface, and the image-side surface S12 thereof is a concave surface. The seventh lens E7 has a positive refractive power, the object-side surface S13 thereof is a convex surface, and the image-side surface S14 thereof is a concave surface. The eighth lens E8 has a negative refractive power, the object-side surface S15 thereof is a concave surface, and the image-side surface S16 thereof is a concave surface. The optical filter E9 has the object-side surface S17 and the image-side surface S18. The light from an object sequentially passes through the respective surfaces S1 to S18 and is finally imaged on the image plane S19.

In the present embodiment, the total effective focal length f of the optical imaging lens assembly is 6.52 mm, the axial distance TTL from the object-side surface S1 of the first lens E1 to the image plane S19 is 8.01 mm, half the diagonal length ImgH of the effective pixel area on the image plane S19 is 6.27 mm, half of a maximal field-of-view Semi-FOV of the optical imaging lens assembly is 43.1°, and the aperture value Fno of the optical imaging lens assembly is 1.69.

Table 13 below is a table illustrating basic parameters of the optical imaging lens assembly of Embodiment 7, where the units for the radius of curvature, the thickness/distance and the focal length are millimeter (mm).

TABLE 13

| Surface Number | Surface Type | Radius of Curvature | Thickness/ Distance | Material Refractive Index | Abbe Number | Focal Length | Conic Coefficient |
|---|---|---|---|---|---|---|---|
| OBJ | spherical | Infinite | Infinite | | | | |
| STO | spherical | Infinite | −0.7379 | | | | |
| S1 | aspheric | 2.8568 | 0.9224 | 1.55 | 56.1 | 6.80 | 0.0000 |
| S2 | aspheric | 10.9935 | 0.1681 | | | | 0.0000 |
| S3 | aspheric | 5.4492 | 0.2500 | 1.68 | 19.2 | −18.05 | 0.0000 |
| S4 | aspheric | 3.7000 | 0.2649 | | | | 0.0000 |
| S5 | aspheric | 10.2087 | 0.3381 | 1.55 | 56.1 | 63.56 | −33.4650 |
| S6 | aspheric | 14.2949 | 0.2676 | | | | 0.0000 |
| S7 | aspheric | −34.0564 | 0.5800 | 1.57 | 37.3 | 20.16 | 0.0000 |
| S8 | aspheric | −8.6510 | 0.0940 | | | | 0.0000 |
| S9 | aspheric | −16.7926 | 0.3428 | 1.68 | 19.2 | −23.98 | 0.0000 |
| S10 | aspheric | 508.2367 | 0.5953 | | | | 0.0000 |
| S11 | aspheric | 72.4274 | 0.4945 | 1.57 | 37.3 | 148.50 | 0.0000 |
| S12 | aspheric | 498.4285 | 0.4596 | | | | 0.0000 |
| S13 | aspheric | 3.4217 | 0.6950 | 1.55 | 56.1 | 6.82 | −11.2031 |
| S14 | aspheric | 38.9572 | 0.9162 | | | | 0.0000 |

TABLE 13-continued

| Surface Number | Surface Type | Radius of Curvature | Thickness/ Distance | Material Refractive Index | Abbe Number | Focal Length | Conic Coefficient |
|---|---|---|---|---|---|---|---|
| S15 | aspheric | −3.6161 | 0.5843 | 1.54 | 55.7 | −4.18 | −2.4005 |
| S16 | aspheric | 6.2331 | 0.1871 | | | | 0.0000 |
| S17 | spherical | Infinite | 0.2100 | 1.52 | 64.2 | | |
| S18 | spherical | Infinite | 0.6430 | | | | |
| S19 | spherical | Infinite | | | | | |

In Embodiment 7, the aspheric lens may be used for both of the object-side surface and image-side surface of any one of the first lens E1 to the eighth lens E8. Table 14 below shows the high-order coefficients A4, A6, A8, A10, A12, A14, A16, A18 and A20 applicable to the aspheric surfaces S1-S16 of the aspheric lenses in the present embodiment.

TABLE 14

| Surface Number | A4 | A6 | A8 | A10 | A12 | A14 | A16 | A18 | A20 |
|---|---|---|---|---|---|---|---|---|---|
| S1 | 5.7196E−04 | −9.3337E−05 | 1.9045E−04 | −1.0983E−04 | 3.6851E−05 | −7.7153E−06 | 9.8775E−07 | −8.8714E−08 | 0.0000E+00 |
| S2 | −7.6427E−03 | 3.2533E−03 | −7.2044E−04 | 3.9117E−05 | 9.8420E−06 | −1.2520E−06 | 0.0000E+00 | 0.0000E+00 | 0.0000E+00 |
| S3 | −2.2157E−02 | 6.8755E−03 | 7.5993E−04 | −1.7372E−03 | 7.8686E−04 | −1.6937E−04 | 1.5176E−05 | 0.0000E+00 | 0.0000E+00 |
| S4 | −1.5503E−02 | 8.2168E−03 | −4.8834E−03 | 4.1847E−03 | −2.3294E−03 | 6.4452E−04 | −5.4024E−05 | −4.1803E−06 | 0.0000E+00 |
| S5 | 1.6169E−03 | −4.3575E−03 | 6.7422E−03 | −9.2489E−03 | 8.6676E−03 | −4.9442E−03 | 1.7030E−03 | −3.1584E−04 | 2.3999E−05 |
| S6 | −5.4709E−03 | −6.9406E−04 | −7.9884E−03 | 1.4888E−02 | −1.4813E−02 | 8.9509E−03 | −3.1962E−03 | 6.2739E−04 | −5.2109E−05 |
| S7 | −6.7314E−03 | −1.0382E−02 | 8.3065E−03 | −1.1373E−02 | 1.0049E−02 | −5.9337E−03 | 2.2014E−03 | −4.6244E−04 | 4.1454E−05 |
| S8 | 1.9573E−02 | −8.0853E−02 | 9.4993E−02 | −8.1562E−02 | 4.8195E−02 | −1.8861E−02 | 4.6325E−03 | −6.4592E−04 | 3.9175E−05 |
| S9 | 9.4928E−03 | −8.8449E−02 | 9.6124E−02 | −7.3292E−02 | 3.9748E−02 | −1.4340E−02 | 3.1927E−03 | −3.8999E−04 | 1.9694E−05 |
| S10 | −6.3521E−03 | −2.9830E−02 | 2.4959E−02 | −1.3805E−02 | 5.5710E−03 | −1.5577E−03 | 2.7604E−04 | −2.7187E−05 | 1.1187E−06 |
| S11 | −8.9131E−03 | 4.9917E−03 | −3.6984E−03 | 1.5116E−03 | −4.4348E−04 | 8.9741E−05 | −1.1751E−05 | 8.8329E−07 | −2.8330E−08 |
| S12 | −4.3034E−02 | 1.5319E−02 | −4.1573E−03 | 8.1606E−04 | −1.1727E−04 | 1.2536E−05 | −9.1214E−07 | 3.7609E−08 | −6.2098E−10 |
| S13 | 1.0549E−02 | −9.5332E−03 | 2.6098E−03 | −7.0883E−04 | 1.4333E−04 | −1.8917E−05 | 1.5342E−06 | −6.8393E−08 | 1.2697E−09 |
| S14 | 2.7480E−02 | −9.6987E−03 | 1.0754E−03 | −3.7570E−06 | −1.5339E−05 | 2.2190E−06 | −1.5341E−07 | 5.3597E−09 | −7.5320E−11 |
| S15 | −8.4575E−03 | 7.0667E−04 | 1.8152E−04 | −3.2847E−05 | 2.4209E−06 | −9.8897E−08 | 2.3406E−09 | −3.0149E−11 | 1.6438E−13 |
| S16 | −2.1991E−02 | 3.5198E−03 | −4.9095E−04 | 4.9544E−05 | −3.3773E−06 | 1.4707E−07 | −3.8720E−09 | 5.5892E−11 | −3.3896E−13 |

Figure 14A:
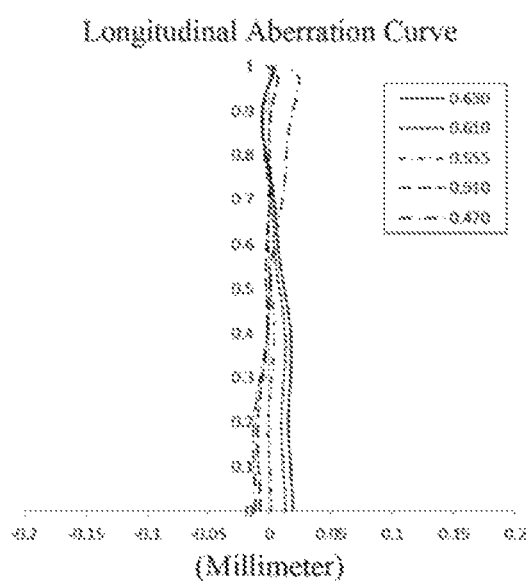
Figure 14B:
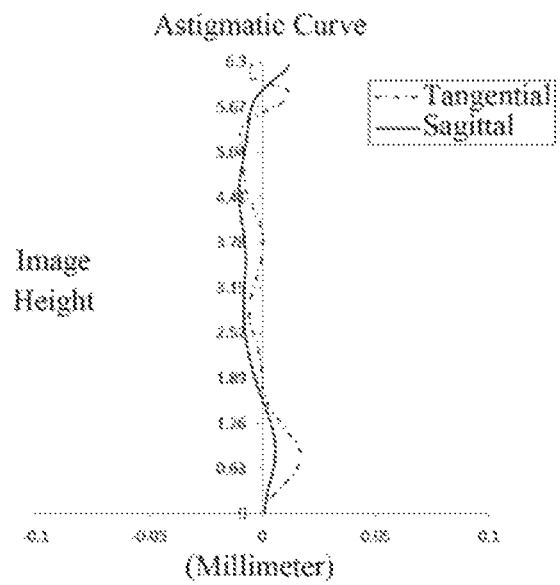

FIG. 14A illustrates a longitudinal aberration curve of the optical imaging system according to Embodiment 7, representing deviations of focal points converged by light of different wavelengths after passing through the optical imaging system. FIG. 14B illustrates an astigmatic curve of the optical imaging system according to Embodiment 7, representing a curvature of a tangential plane and a curvature of a sagittal plane. FIG. 14C illustrates a distortion curve of the optical imaging system according to Embodiment 7, representing amounts of distortion at different image heights. FIG. 14D illustrates a lateral color curve of the optical imaging system according to Embodiment 7, representing deviations of different image heights on the imaging plane after light passes through the optical imaging system. It can be seen from FIG. 14A to FIG. 14D that the optical imaging lens assembly provided in Embodiment 7 may achieve good imaging quality.

Embodiment 8

An imaging lens assembly according to Embodiment 8 of the present disclosure is described with reference to FIG. 15 to FIG. 16D. FIG. 15 shows the schematic structural diagram of the optical imaging lens assembly according to Embodiment 8 of the present disclosure.

As shown in FIG. 15, the optical imaging lens assembly sequentially includes, along the optical axis from the object side to the image side, a diaphragm STO, a first lens E1, a second lens E2, a third lens E3, a fourth lens E4, a fifth lens E5, a sixth lens E6, a seventh lens E7, an eighth lens E8, an optical filter E9 and an image plane E19.

The first lens E1 has a positive refractive power, the object-side surface S1 thereof is a convex surface, and the image-side surface S2 thereof is a concave surface. The second lens E2 has a negative refractive power, the object-side surface S3 thereof is a convex surface, and the image-side surface S4 thereof is a concave surface. The third lens E3 has a positive refractive power, the object-side surface S5 thereof is a convex surface, and the image-side surface S6 thereof is a concave surface. The fourth lens E4 has a positive refractive power, the object-side surface S7 thereof is a concave surface, and the image-side surface S8 thereof is a convex surface. The fifth lens E5 has a negative refractive power, the object-side surface S9 thereof is a concave surface, and the image-side surface S10 thereof is a concave surface. The sixth lens E6 has a positive refractive power, the object-side surface S11 thereof is a convex surface, and the image-side surface S12 thereof is a convex surface. The seventh lens E7 has a positive refractive power, the object-side surface S13 thereof is a convex surface, and the image-side surface S14 thereof is a concave surface. The eighth lens E8 has a negative refractive power, the object-side surface S15 thereof is a concave surface, and the image-side surface S16 thereof is a concave surface. The optical filter E9 has the object-side surface S17 and the image-side surface S18. The light from an object sequentially passes through the respective surfaces S1 to S18 and is finally imaged on the image plane S19.

In the present embodiment, the total effective focal length f of the optical imaging lens assembly is 6.51 mm, the axial distance TTL from the object-side surface S1 of the first lens E1 to the image plane S19 is 8.01 mm, half the diagonal length ImgH of the effective pixel area on the image plane S19 is 6.27 mm, half of a maximal field-of-view Semi-FOV of the optical imaging lens assembly is 43.1°, and the aperture value Fno of the optical imaging lens assembly is 1.69.

Table 15 below is a table illustrating basic parameters of the optical imaging lens assembly of Embodiment 8, where the units for the radius of curvature, the thickness/distance and the focal length are millimeter (mm).

TABLE 15

| Surface Number | Surface Type | Radius of Curvature | Thickness/ Distance | Material Refractive Index | Abbe Number | Focal Length | Conic Coefficient |
|---|---|---|---|---|---|---|---|
| OBJ | spherical | Infinite | Infinite | | | | |
| STO | spherical | Infinite | −0.7371 | | | | |
| S1 | aspheric | 2.8569 | 0.9219 | 1.55 | 56.1 | 6.80 | 0.0000 |
| S2 | aspheric | 11.0077 | 0.1685 | | | | 0.0000 |
| S3 | aspheric | 5.4505 | 0.2500 | 1.68 | 19.2 | −18.04 | 0.0000 |
| S4 | aspheric | 3.6999 | 0.2650 | | | | 0.0000 |
| S5 | aspheric | 10.1995 | 0.3381 | 1.55 | 56.1 | 63.75 | −33.3343 |
| S6 | aspheric | 14.2583 | 0.2679 | | | | 0.0000 |
| S7 | aspheric | −34.2219 | 0.5800 | 1.57 | 37.3 | 20.18 | 0.0000 |
| S8 | aspheric | −8.6668 | 0.0948 | | | | 0.0000 |
| S9 | aspheric | −16.6721 | 0.3429 | 1.68 | 19.2 | −24.08 | 0.0000 |
| S10 | aspheric | 764.4147 | 0.5974 | | | | 0.0000 |
| S11 | aspheric | 91.0031 | 0.4944 | 1.57 | 37.3 | 140.86 | 0.0000 |
| S12 | aspheric | −684.5820 | 0.4585 | | | | 0.0000 |
| S13 | aspheric | 3.4211 | 0.6950 | 1.55 | 56.1 | 6.84 | −11.3540 |
| S14 | aspheric | 37.9582 | 0.9157 | | | | 0.0000 |
| S15 | aspheric | −3.6197 | 0.5832 | 1.54 | 55.7 | −4.18 | −2.4044 |
| S16 | aspheric | 6.2182 | 0.1867 | | | | 0.0000 |
| S17 | spherical | Infinite | 0.2100 | 1.52 | 64.2 | | |
| S18 | spherical | Infinite | 0.6430 | | | | |
| S19 | spherical | Infinite | | | | | |

In Embodiment 8, the aspheric lens may be used for both of the object-side surface and image-side surface of any one of the first lens E1 to the eighth lens E8. Table 16 below shows the high-order coefficients A4, A6, A8, A10, A12, A14, A16, A18 and A20 applicable to the aspheric surfaces S1-S16 of the aspheric lenses in the present embodiment.

TABLE 16

| Surface Number | A4 | A6 | A8 | A10 | A12 | A14 | A16 | A18 | A20 |
|---|---|---|---|---|---|---|---|---|---|
| S1 | 5.7207E−04 | −9.3364E−05 | 1.9052E−04 | −1.0988E−04 | 3.6872E−05 | −7.7205E−06 | 9.8851E−07 | −8.8790E−08 | 0.0000E+00 |
| S2 | −7.6377E−03 | 3.2501E−03 | −7.1950E−04 | 3.9053E−05 | 9.8227E−06 | −1.2491E−06 | 0.0000E+00 | 0.0000E+00 | 0.0000E+00 |
| S3 | −2.2161E−02 | 6.8774E−03 | 7.6020E−04 | −1.7380E−03 | 7.8728E−04 | −1.6947E−04 | 1.5187E−05 | 0.0000E+00 | 0.0000E+00 |
| S4 | −1.5515E−02 | 8.2264E−03 | −4.8910E−03 | 4.1929E−03 | −2.3349E−03 | 6.4628E−04 | −5.4192E−05 | −4.1950E−06 | 0.0000E+00 |
| S5 | 1.6089E−03 | −4.2761E−03 | 6.5359E−03 | −8.9935E−03 | 8.4907E−03 | −4.8707E−03 | 1.6846E−03 | −3.1325E−04 | 2..3839E−05 |
| S6 | −5.4742E−03 | −6.3097E−04 | −8.2377E−03 | 1.5304E−02 | −1.5209E−02 | 9.1818E−03 | −3.2772E−03 | 6.4291E−04 | −5.3354E−05 |
| S7 | −6.6523E−03 | −1.0730E−02 | 9.0202E−03 | −1.2358E−02 | 1.0943E−02 | −6.4471E−03 | 2.3812E−03 | −4.9750E−04 | 4.4373E−05 |
| S8 | 1.9493E−02 | −8.0467E−02 | 9.4343E−02 | −8.1038E−02 | 4.7973E−02 | −1.8813E−02 | 4.6279E−03 | −6.4593E−04 | 3.9195E−05 |
| S9 | 9.3163E−03 | −8.7647E−02 | 9.4833E−02 | −7.2273E−02 | 3.9315E−02 | −1.4244E−02 | 3.1845E−03 | −3.9040E−04 | 1.9777E−05 |
| S10 | −6.3329E−03 | −2.9535E−02 | 2.4467E−02 | −1.3415E−02 | 5.3949E−03 | −1.5100E−03 | 2.6839E−04 | −2.6516E−05 | 1.0939E−06 |
| S11 | −9.0092E−03 | 5.3910E−03 | −4.1148E−03 | 1.7208E−03 | −5.0444E−04 | 1.0057E−04 | −1.2914E−05 | 9.5321E−07 | −3.0148E−08 |
| S12 | −4.3567E−02 | 1.6054E−02 | −4.6673E−03 | 1.0137E−03 | −1.6344E−04 | 1.9185E−05 | −1.4880E−06 | 6.5031E−08 | −1.1715E−09 |
| S13 | 1.0023E−02 | −9.1203E−03 | 2.4344E−03 | −6.5741E−04 | 1.3341E−04 | −1.7687E−05 | 1.4395E−06 | −6.4311E−08 | 1.1949E−09 |
| S14 | 2.6846E−02 | −9.3746E−03 | 9.8927E−04 | 1.1651E−05 | −1.7278E−05 | 2.3814E−06 | −1.6179E−07 | 5.5979E−09 | −7.8166E−11 |
| S15 | −8.3449E−03 | 6.9037E−04 | 1.7992E−04 | −3.2350E−05 | 2.3755E−06 | −9.6765E−08 | 2.2857E−09 | −2.9420E−11 | 1.6054E−13 |
| S16 | −2.1873E−02 | 3.4931E−03 | −4.8961E−04 | 4.9641E−05 | −3.3880E−06 | 1.4729E−07 | −3.8663E−09 | 5.5629E−11 | −3.3643E−13 |

Figure 16A:
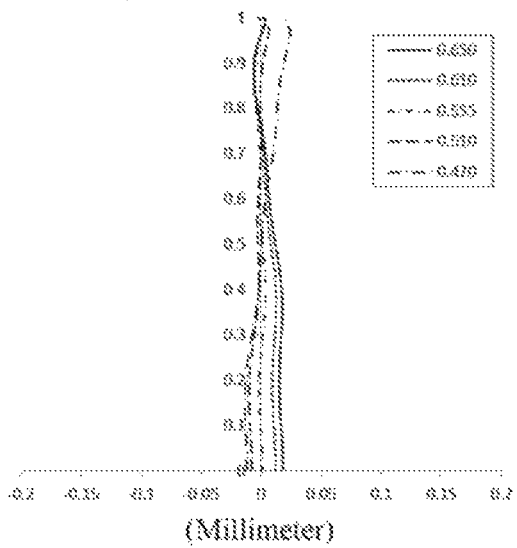
FIGS. 16A-16D respectively illustrate a longitudinal aberration curve, an astigmatic curve, a distortion curve and a lateral color curve of the imaging lens assembly according to Embodiment 8.
Figure 16B:
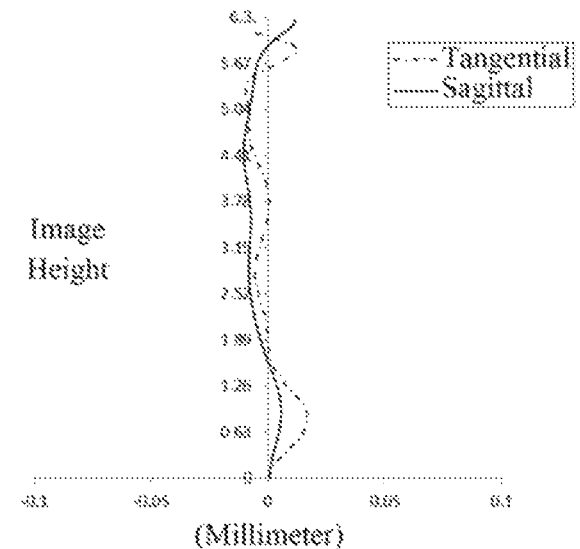
Figure 16C:
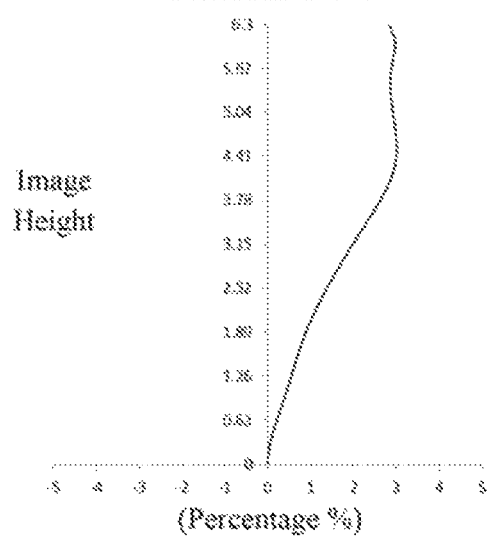
Figure 16D:
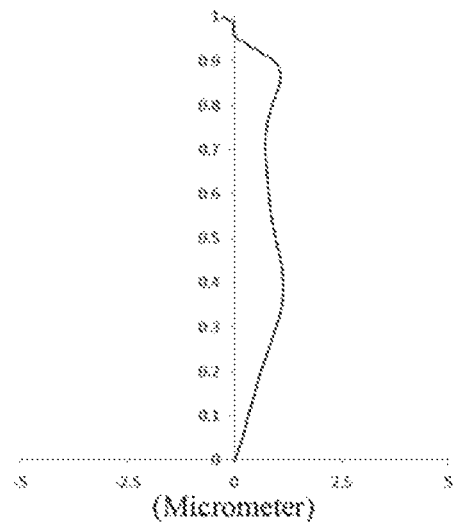

FIG. 16A illustrates a longitudinal aberration curve of the optical imaging system according to Embodiment 8, representing deviations of focal points converged by light of different wavelengths after passing through the optical imaging system. FIG. 16B illustrates an astigmatic curve of the optical imaging system according to Embodiment 8, representing a curvature of a tangential plane and a curvature of a sagittal plane. FIG. 16C illustrates a distortion curve of the optical imaging system according to Embodiment 8, representing amounts of distortion at different image heights. FIG. 16D illustrates a lateral color curve of the optical imaging system according to Embodiment 8, representing deviations of different image heights on the imaging plane after light passes through the optical imaging system. It can be seen from FIG. 16A to FIG. 16D that the optical imaging lens assembly provided in Embodiment 8 may achieve good imaging quality.

Embodiment 9

Figure 17:
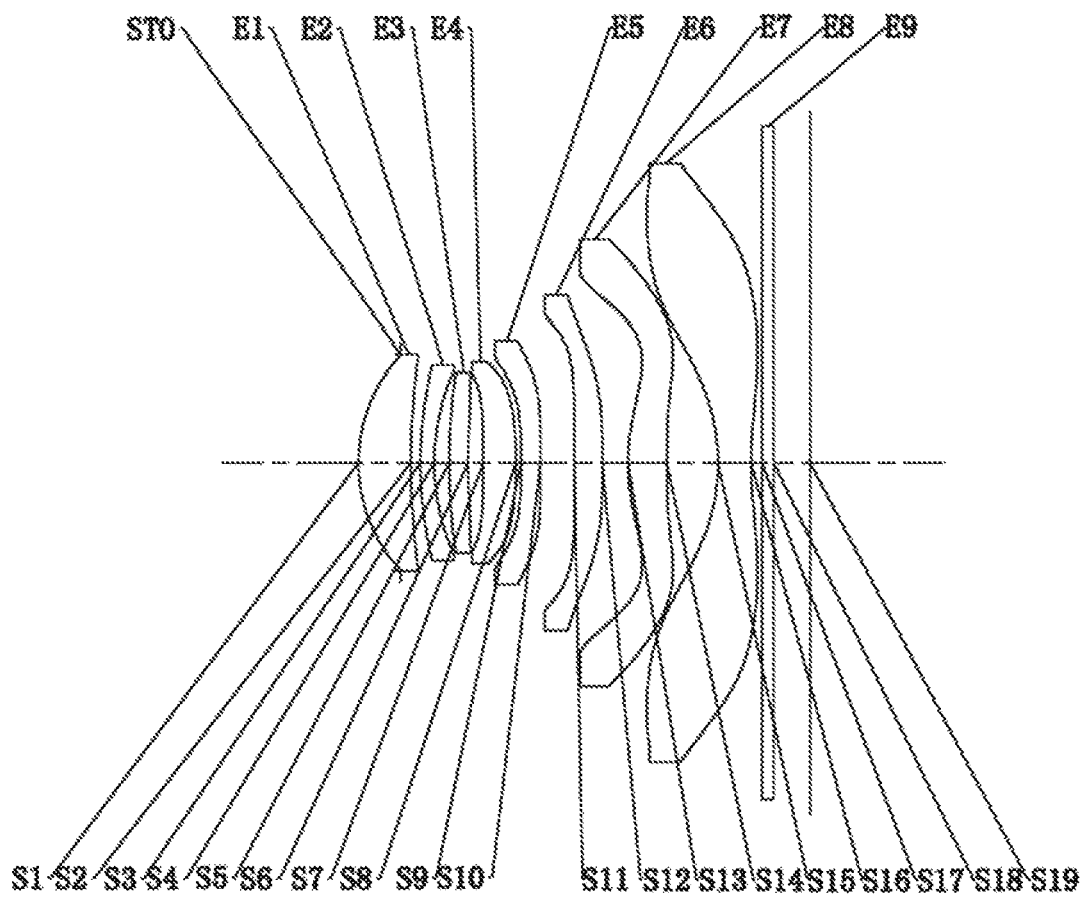
FIG. 17 is a schematic structural diagram illustrating an imaging lens assembly according to Embodiment 9.

An imaging lens assembly according to Embodiment 9 of the present disclosure is described with reference to FIG. 17 to FIG. 18D. FIG. 17 shows the schematic structural diagram of the optical imaging lens assembly according to Embodiment 9 of the present disclosure.

As shown in FIG. 17, the optical imaging lens assembly sequentially includes, along the optical axis from the object side to the image side, a diaphragm STO, a first lens E1, a second lens E2, a third lens E3, a fourth lens E4, a fifth lens E5, a sixth lens E6, a seventh lens E7, an eighth lens E8, an optical filter E9 and an image plane E19.

The first lens E1 has a positive refractive power, the object-side surface S1 thereof is a convex surface, and the image-side surface S2 thereof is a concave surface. The second lens E2 has a negative refractive power, the object-side surface S3 thereof is a convex surface, and the image-side surface S4 thereof is a concave surface. The third lens E3 has a positive refractive power, the object-side surface S5 thereof is a convex surface, and the image-side surface S6 thereof is a concave surface. The fourth lens E4 has a positive refractive power, the object-side surface S7 thereof is a concave surface, and the image-side surface S8 thereof is a convex surface. The fifth lens E5 has a negative refractive power, the object-side surface S9 thereof is a concave surface, and the image-side surface S10 thereof is a convex surface. The sixth lens E6 has a positive refractive power, the object-side surface S11 thereof is a convex surface, and the image-side surface S12 thereof is a concave surface. The seventh lens E7 has a positive refractive power, the object-side surface S13 thereof is a convex surface, and the image-side surface S14 thereof is a concave surface. The eighth lens E8 has a negative refractive power, the object-side surface S15 thereof is a concave surface, and the image-side surface S16 thereof is a concave surface. The optical filter E9 has the object-side surface S17 and the image-side surface S18. The light from an object sequentially passes through the respective surfaces S1 to S18 and is finally imaged on the image plane S19.

In the present embodiment, the total effective focal length f of the optical imaging lens assembly is 6.52 mm, the axial distance TTL from the object-side surface S1 of the first lens E1 to the image plane S19 is 8.02 mm, half the diagonal length ImgH of the effective pixel area on the image plane S19 is 6.27 mm, half of a maximal field-of-view Semi-FOV of the optical imaging lens assembly is 43.1°, and the aperture value Fno of the optical imaging lens assembly is 1.69.

Table 17 below is a table illustrating basic parameters of the optical imaging lens assembly of Embodiment 9, where the units for the radius of curvature, the thickness/distance and the focal length are millimeter (mm).

TABLE 17

| Surface Number | Surface Type | Radius of Curvature | Thickness/ Distance | Material Refractive Index | Abbe Number | Focal Length | Conic Coefficient |
|---|---|---|---|---|---|---|---|
| OBJ | spherical | Infinite | Infinite | | | | |
| STO | spherical | Infinite | −0.7447 | | | | |
| S1 | aspheric | 2.8582 | 0.9289 | 1.55 | 56.1 | 6.79 | 0.0000 |
| S2 | aspheric | 11.0381 | 0.1668 | | | | 0.0000 |
| S3 | aspheric | 5.4595 | 0.2500 | 1.68 | 19.2 | −18.00 | 0.0000 |
| S4 | aspheric | 3.7013 | 0.2656 | | | | 0.0000 |
| S5 | aspheric | 10.2146 | 0.3387 | 1.55 | 56.1 | 63.81 | −33.8213 |
| S6 | aspheric | 14.2829 | 0.2655 | | | | 0.0000 |
| S7 | aspheric | −33.9270 | 0.5800 | 1.57 | 37.3 | 19.95 | 0.0000 |
| S8 | aspheric | −8.5751 | 0.0935 | | | | 0.0000 |
| S9 | aspheric | −16.0951 | 0.3461 | 1.68 | 19.2 | −23.94 | 0.0000 |
| S10 | aspheric | −2130.8451 | 0.5972 | | | | 0.0000 |
| S11 | aspheric | 81.6122 | 0.5000 | 1.57 | 37.3 | 166.66 | 0.0000 |
| S12 | aspheric | 575.6253 | 0.4546 | | | | 0.0000 |
| S13 | aspheric | 3.4066 | 0.6950 | 1.55 | 56.1 | 6.77 | −11.4116 |
| S14 | aspheric | 40.3144 | 0.9075 | | | | 0.0000 |
| S15 | aspheric | −3.6219 | 0.5856 | 1.54 | 55.7 | −4.18 | −2.4120 |
| S16 | aspheric | 6.2241 | 0.1949 | | | | 0.0000 |
| S17 | spherical | Infinite | 0.2100 | 1.52 | 64.2 | | |
| S18 | spherical | Infinite | 0.6430 | | | | |
| S19 | spherical | Infinite | | | | | |

In Embodiment 9, the aspheric lens may be used for both of the object-side surface and image-side surface of any one of the first lens E1 to the eighth lens E8. Table 18 below shows the high-order coefficients A4, A6, A8, A10, A12, A14, A16, A18 and A20 applicable to the aspheric surfaces S1-S16 of the aspheric lenses in the present embodiment.

TABLE 18

| Surface Number | A4 | A6 | A8 | A10 | A12 | A14 | A16 | A18 | A20 |
|---|---|---|---|---|---|---|---|---|---|
| S1 | 5.6873E−04 | −9.2546E−05 | 1.8830E−04 | −1.0828E−04 | 3.6229E−05 | −7.5636E−06 | 9.6558E−07 | −8.6476E−08 | 0.0000E+00 |
| S2 | −7.6408E−03 | 3.2520E−03 | −7.2007E−04 | 3.9091E−05 | 9.8343E−06 | −1.2508E−06 | 0.0000E+00 | 0.0000E+00 | 0.0000E+00 |
| S3 | −2.2117E−02 | 6.8569E−03 | 7.5719E−04 | −1.7294E−03 | 7.8260E−04 | −1.6830E−04 | 1.5067E−05 | 0.0000E+00 | 0.0000E+00 |
| S4 | −1.5488E−02 | 8.2047E−03 | −4.8738E−03 | 4.1744E−03 | −2.3225E−03 | 6.4231E−04 | −5.3812E−05 | −4.1618E−06 | 0.0000E+00 |
| S5 | 1.1865E−03 | −2.8774E−03 | 3.6201E−03 | −5.2232E−03 | 5.4804E−03 | −3.3787E−03 | 1.2356E−03 | −2.3803E−04 | 1.8454E−05 |
| S6 | −5.6441E−03 | −5.8853E−04 | −7.8498E−03 | 1.4626E−02 | −1.4652E−02 | 8.9453E−03 | −3.2341E−03 | 6.4318E−04 | −5.4074E−05 |
| S7 | −6.7789E−03 | −9.8298E−03 | 6.0188E−03 | −7.0983E−03 | 5.6869E−03 | −3.2987E−03 | 1.2593E−03 | −2.7865E−04 | 2.6441E−05 |
| S8 | 2.0665E−02 | −8.4486E−02 | 1.0003E−01 | −8.5752E−02 | 5.0511E−02 | −1.9721E−02 | 4.8363E−03 | −6.7332E−04 | 4.0746E−05 |
| S9 | 1.0337E−02 | −9.1030E−02 | 9.9546E−02 | −7.5897E−02 | 4.1049E−02 | −1.4792E−02 | 3.2992E−03 | −4.0476E−04 | 2.0582E−05 |

TABLE 18-continued

| Surface Number | A4 | A6 | A8 | A10 | A12 | A14 | A16 | A18 | A20 |
|---|---|---|---|---|---|---|---|---|---|
| S10 | −6.1757E−03 | −3.0220E−02 | 2.5509E−02 | −1.4173E−02 | 5.6997E−03 | −1.5818E−03 | 2.7821E−04 | −2.7234E−05 | 1.1154E−06 |
| S11 | −8.4406E−03 | 4.1769E−03 | −3.0025E−03 | 1.1709E−03 | −3.4350E−04 | 7.1711E−05 | −9.7825E−06 | 7.6354E−07 | −2.5212E−08 |
| S12 | −4.3045E−02 | 1.4859E−02 | −3.7048E−03 | 6.1323E−04 | −6.6153E−05 | 4.9148E−06 | −2.4611E−07 | 6.0662E−09 | 4.8630E−12 |
| S13 | 1.1208E−02 | −1.0345E−02 | 3.0802E−03 | −8.5758E−04 | 1.7087E−04 | −2.1956E−05 | 1.7289E−06 | −7.5036E−08 | 1.3621E−09 |
| S14 | 2.7696E−02 | −1.0041E−02 | 1.2554E−03 | −5.4511E−05 | −7.2230E−06 | 1.4651E−06 | −1.1323E−07 | 4.2236E−09 | −6.2136E−11 |
| S15 | −7.9927E−03 | 4.2652E−04 | 2.4786E−04 | −4.1108E−05 | 3.0273E−06 | −1.2615E−07 | 3.0783E−09 | −4.1205E−11 | 2.3487E−13 |
| S16 | −2.1805E−02 | 3.5075E−03 | −5.0527E−04 | 5.3464E−05 | −3.8203E−06 | 1.7369E−07 | −4.7628E−09 | 7.1568E−11 | −4.5208E−13 |

Figure 18A:
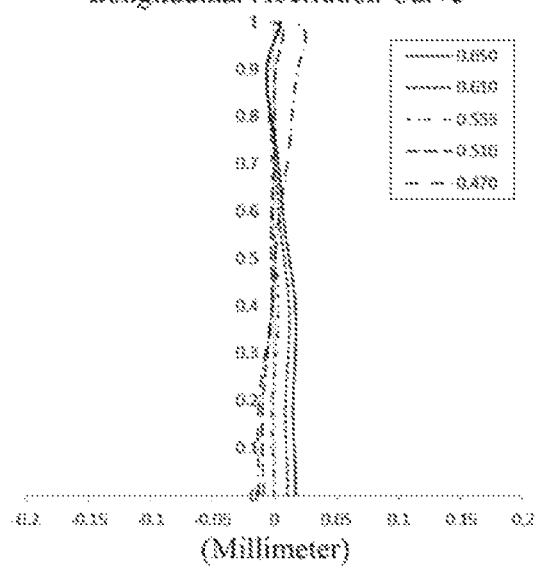
FIGS. 18A-18D respectively illustrate a longitudinal aberration curve, an astigmatic curve, a distortion curve and a lateral color curve of the imaging lens assembly according to Embodiment 9.
Figure 18B:
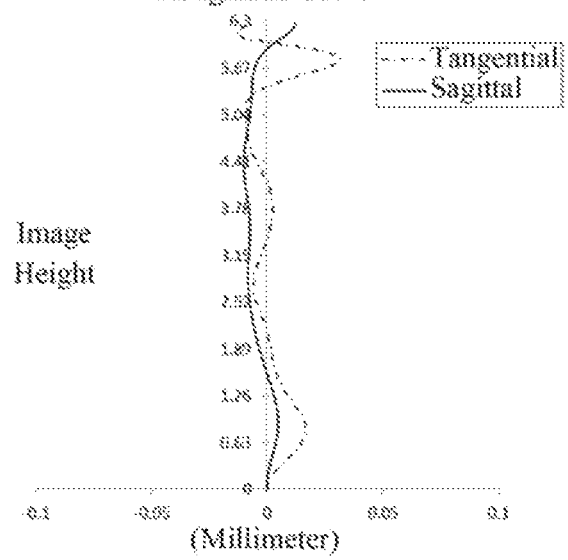
Figures 18C, 18D:
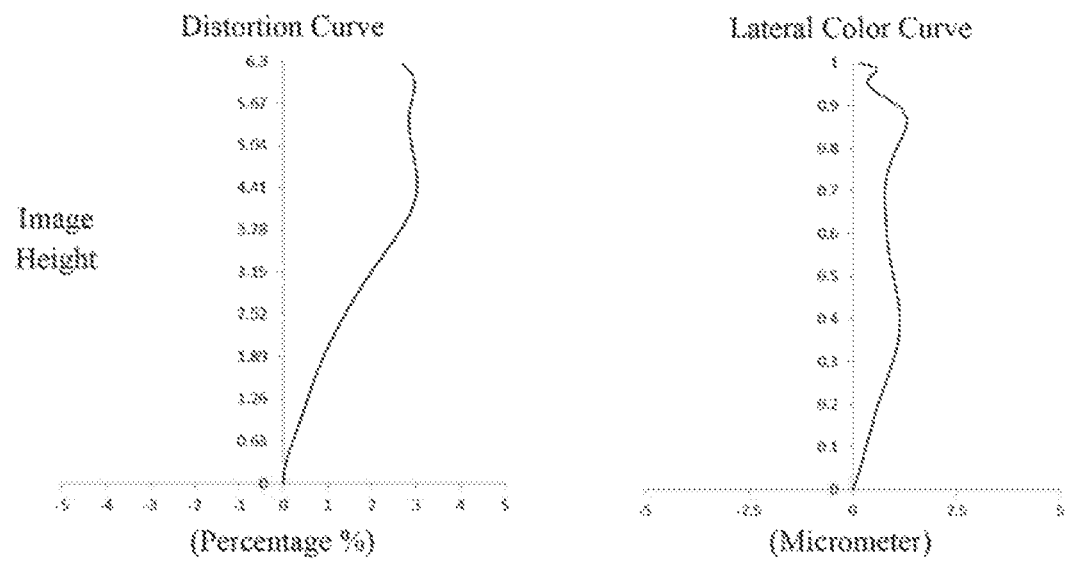

FIG. 18A illustrates a longitudinal aberration curve of the optical imaging system according to Embodiment 9, representing deviations of focal points converged by light of different wavelengths after passing through the optical imaging system. FIG. 18B illustrates an astigmatic curve of the optical imaging system according to Embodiment 9, representing a curvature of a tangential plane and a curvature of a sagittal plane. FIG. 18C illustrates a distortion curve of the optical imaging system according to Embodiment 9, representing amounts of distortion at different image heights. FIG. 18D illustrates a lateral color curve of the optical imaging system according to Embodiment 9, representing deviations of different image heights on the imaging plane after light passes through the optical imaging system. It can be seen from FIG. 18A to FIG. 18D that the optical imaging lens assembly provided in Embodiment 9 may achieve good imaging quality.

Embodiment 10

Figure 19:
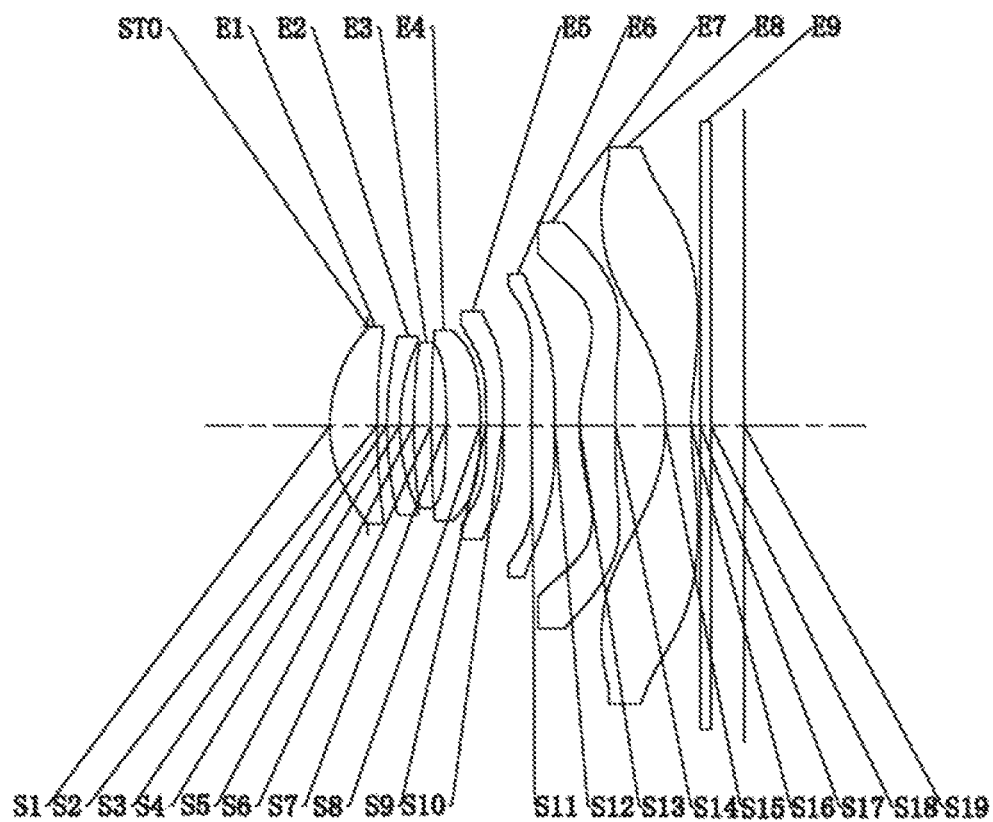
FIG. 19 is a schematic structural diagram illustrating an imaging lens assembly according to Embodiment 10.

An imaging lens assembly according to Embodiment 10 of the present disclosure is described with reference to FIG. 19 to FIG. 20D. FIG. 19 shows the schematic structural diagram of the optical imaging lens assembly according to Embodiment 10 of the present disclosure.

As shown in FIG. 19, the optical imaging lens assembly sequentially includes, along the optical axis from the object side to the image side, a diaphragm STO, a first lens E1, a second lens E2, a third lens E3, a fourth lens E4, a fifth lens E5, a sixth lens E6, a seventh lens E7, an eighth lens E8, an optical filter E9 and an image plane E19.

The first lens E1 has a positive refractive power, the object-side surface S1 thereof is a convex surface, and the image-side surface S2 thereof is a concave surface. The second lens E2 has a negative refractive power, the object-side surface S3 thereof is a convex surface, and the image-side surface S4 thereof is a concave surface. The third lens E3 has a positive refractive power, the object-side surface S5 thereof is a convex surface, and the image-side surface S6 thereof is a concave surface. The fourth lens E4 has a positive refractive power, the object-side surface S7 thereof is a concave surface, and the image-side surface S8 thereof is a convex surface. The fifth lens E5 has a negative refractive power, the object-side surface S9 thereof is a concave surface, and the image-side surface S10 thereof is a concave surface. The sixth lens E6 has a positive refractive power, the object-side surface S11 thereof is a convex surface, and the image-side surface S12 thereof is a concave surface. The seventh lens E7 has a positive refractive power, the object-side surface S13 thereof is a convex surface, and the image-side surface S14 thereof is a convex surface. The eighth lens E8 has a negative refractive power, the object-side surface S15 thereof is a concave surface, and the image-side surface S16 thereof is a concave surface. The optical filter E9 has the object-side surface S17 and the image-side surface S18. The light from an object sequentially passes through the respective surfaces S1 to S18 and is finally imaged on the image plane S19.

In the present embodiment, the total effective focal length f of the optical imaging lens assembly is 6.51 mm, the axial distance TTL from the object-side surface S1 of the first lens E1 to the image plane S19 is 8.04 mm, half the diagonal length ImgH of the effective pixel area on the image plane S19 is 6.17 mm, half of a maximal field-of-view Semi-FOV of the optical imaging lens assembly is 42.9°, and the aperture value Fno of the optical imaging lens assembly is 1.69.

Table 19 below is a table illustrating basic parameters of the optical imaging lens assembly of Embodiment 10, where the units for the radius of curvature, the thickness/distance and the focal length are millimeter (mm).

TABLE 19

| Surface Number | Surface Type | Radius of Curvature | Thickness/ Distance | Material Refractive Index | Material Abbe Number | Focal Length | Conic Coefficient |
|---|---|---|---|---|---|---|---|
| OBJ | spherical | Infinite | Infinite | | | | |
| STO | spherical | Infinite | −0.7362 | | | | |
| S1 | spherical | 2.8563 | 0.9170 | 1.55 | 56.1 | 6.59 | 0.0000 |
| S2 | spherical | 12.2998 | 0.1888 | | | | 0.0000 |
| S3 | spherical | 5.7132 | 0.2502 | 1.68 | 19.2 | −16.26 | 0.0000 |
| S4 | spherical | 3.6955 | 0.2723 | | | | 0.0000 |
| S5 | spherical | 10.8840 | 0.3387 | 1.55 | 56.1 | 53.96 | −35.1474 |
| S6 | spherical | 17.0716 | 0.2943 | | | | 0.0000 |
| S7 | spherical | −21.2373 | 0.6636 | 1.57 | 37.3 | 24.19 | 0.0000 |
| S8 | spherical | −8.4593 | 0.1131 | | | | 0.0000 |
| S9 | spherical | −19.0465 | 0.3257 | 1.68 | 19.2 | −25.40 | 0.0000 |
| S10 | spherical | 179.9953 | 0.5580 | | | | 0.0000 |
| S11 | spherical | 32.4062 | 0.4440 | 1.57 | 37.3 | 96.08 | 0.0000 |

TABLE 19-continued

| Surface Number | Surface Type | Radius of Curvature | Thickness/ Distance | Material Refractive Index | Abbe Number | Focal Length | Conic Coefficient |
|---|---|---|---|---|---|---|---|
| S12 | spherical | 78.8975 | 0.4812 | | | | 0.0000 |
| S13 | spherical | 3.6935 | 0.6950 | 1.55 | 56.1 | 6.72 | −10.8565 |
| S14 | spherical | −562.7900 | 0.9734 | | | | 0.0000 |
| S15 | spherical | −3.6147 | 0.5000 | 1.54 | 55.7 | −4.11 | −2.3162 |
| S16 | spherical | 5.9431 | 0.1747 | | | | 0.0000 |
| S17 | spherical | Infinite | 0.2100 | 1.52 | 64.2 | | |
| S18 | spherical | Infinite | 0.6429 | | | | |
| S19 | spherical | Infinite | | | | | |

In Embodiment 10, the aspheric lens may be used for both of the object-side surface and image-side surface of any one of the first lens E1 to the eighth lens E8. Table 20 below shows the high-order coefficients A4, A6, A8, A10, A12, A14, A16, A18 and A20 applicable to the aspheric surfaces S1-S16 of the aspheric lenses in the present embodiment.

TABLE 20

| Surface Number | A4 | A6 | A8 | A10 | A12 | A14 | A16 | A18 | A20 |
|---|---|---|---|---|---|---|---|---|---|
| S1 | 6.8611E−04 | 3.8047E−05 | 9.9092E−05 | −3.8357E−05 | 3.6359E−06 | 1.6474E−06 | −4.6363E−07 | 0.0000E+00 | 0.0000E+00 |
| S2 | −6.4197E−03 | 4.4425E−03 | −2.1630E−03 | 7.1843E−04 | −1.4445E−04 | 1.2421E−05 | 0.0000E+00 | 0.0000E+00 | 0.0000E+00 |
| S3 | −2.2904E−02 | 1.0882E−02 | −2.8278E−03 | −5.9839E−05 | 3.5324E−04 | −1.1291E−04 | 1.2694E−05 | 0.0000E+00 | 0.0000E+00 |
| S4 | −1.7878E−02 | 1.1536E−02 | −6.1213E−03 | 3.7900E−03 | −1.8463E−03 | 5.3883E−04 | −6.4657E−05 | 0.0000E+00 | 0.0000E+00 |
| S5 | 3.8113E−04 | −4.3704E−03 | 1.1014E−02 | −1.7375E−02 | 1.7112E−02 | −1.0354E−02 | 3.8103E−03 | −7.7285E−04 | 6.6132E−05 |
| S6 | −5.1168E−03 | −2.1550E−03 | 3.3878E−04 | −2.7667E−04 | 6.5694E−04 | −6.1816E−04 | 3.2695E−04 | −8.0272E−05 | 7.1959E−06 |
| S7 | −8.9151E−03 | −7.9870E−03 | 4.5449E−03 | −4.6717E−03 | 2.0306E−03 | −1.1193E−04 | −3.2176E−04 | 1.4255E−04 | −2.0543E−05 |
| S8 | 1.1213E−02 | −5.8767E−02 | 6.4217E−02 | −5.0482E−02 | 2.6872E−02 | −9.7149E−03 | 2.3289E−03 | −3.3574E−04 | 2.1901E−05 |
| S9 | 2.3023E−03 | −6.3372E−02 | 5.2823E−02 | −2.4184E−02 | 4.3309E−03 | 1.1828E−03 | −7.7066E−04 | 1.4921E−04 | −1.0365E−05 |
| S10 | −5.5251E−03 | −3.0959E−02 | 2.3940E−02 | −1.0988E−02 | 3.1467E−03 | −5.0407E−04 | 2.9124E−05 | 2.5335E−06 | −3.2191E−07 |
| S11 | −8.9166E−03 | 3.0338E−03 | −2.3055E−03 | 1.1659E−03 | −4.0808E−04 | 8.6961E−05 | −1.1001E−05 | 7.7278E−07 | −2.3203E−08 |
| S12 | −4.2844E−02 | 1.6382E−02 | −6.0743E−03 | 2.1158E−03 | −5.5446E−04 | 9.2985E−05 | −9.2064E−06 | 4.8922E−07 | −1.0761E−08 |
| S13 | 4.0118E−03 | −4.6026E−03 | 7.8875E−04 | −2.2592E−04 | 5.6411E−05 | −9.0338E−06 | 8.6186E−07 | −4.3564E−08 | 8.8813E−10 |
| S14 | 2.3933E−02 | −6.2220E−03 | 1.4424E−04 | 1.4072E−04 | −2.9951E−05 | 3.1645E−06 | −1.8978E−07 | 6.0883E−09 | −8.0868E−11 |
| S15 | −9.0522E−03 | 1.2792E−03 | 4.2384E−05 | −1.6748E−05 | 1.3862E−06 | −5.9807E−08 | 1.4803E−09 | −1.9996E−11 | 1.1477E−13 |
| S16 | −2.2247E−02 | 3.6892E−03 | −5.3856E−04 | 5.5632E−05 | −3.8195E−06 | 1.6688E−07 | −4.4194E−09 | 6.4549E−11 | −3.9965E−13 |

Figure 20A:
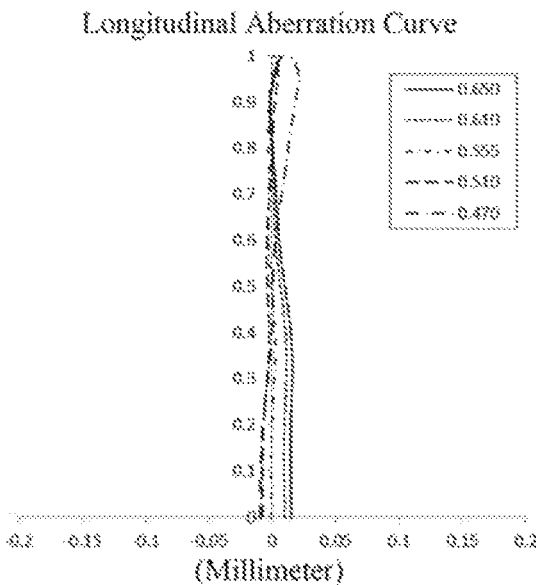
FIGS. 20A-20D respectively illustrate a longitudinal aberration curve, an astigmatic curve, a distortion curve and a lateral color curve of the imaging lens assembly according to Embodiment 10.
Figure 20B:
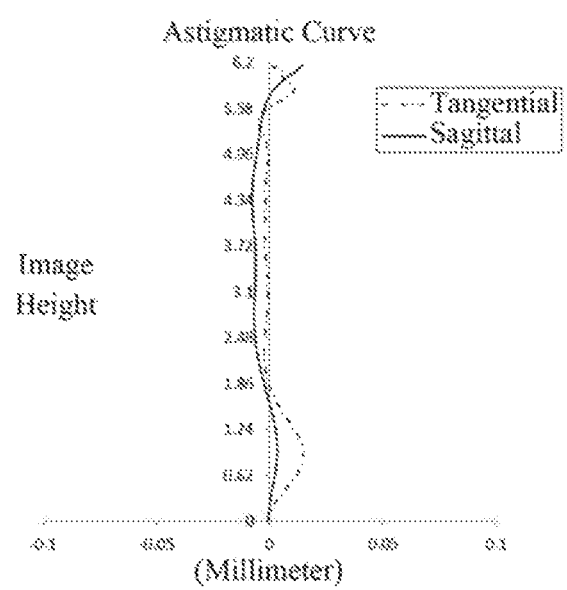
Figure 20C:
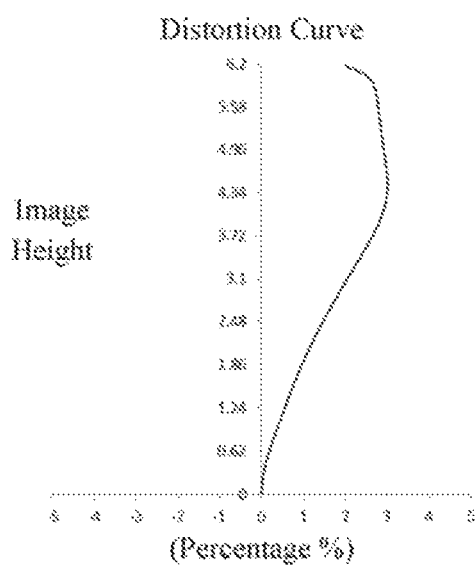
Figure 20D:
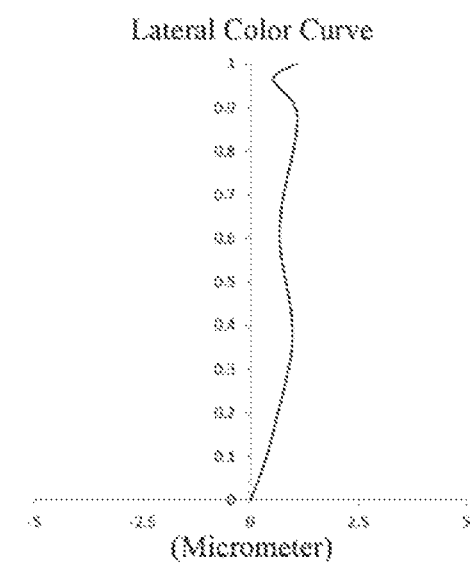

FIG. 20A illustrates a longitudinal aberration curve of the optical imaging system according to Embodiment 10, representing deviations of focal points converged by light of different wavelengths after passing through the optical imaging system. FIG. 20B illustrates an astigmatic curve of the optical imaging system according to Embodiment 10, representing a curvature of a tangential plane and a curvature of a sagittal plane. FIG. 20C illustrates a distortion curve of the optical imaging system according to Embodiment 10, representing amounts of distortion at different image heights. FIG. 20D illustrates a lateral color curve of the optical imaging system according to Embodiment 10, representing deviations of different image heights on the imaging plane after light passes through the optical imaging system. It can be seen from FIG. 20A to FIG. 20D that the optical imaging lens assembly provided in Embodiment 10 may achieve good imaging quality.

To sum up, in Embodiments 1-10 described above, the conditional expressions satisfy the relationships shown in Table 21 below.

TABLE 21

| Conditional Expresion | Embodiment | | | | | | | | | |
| | 1 | 2 | 3 | 4 | 5 | 6 | 7 | 8 | 9 | 10 |
|---|---|---|---|---|---|---|---|---|---|---|
| ImgH (mm) | 6.27 | 6.00 | 6.00 | 6.10 | 6.00 | 6.10 | 6.27 | 6.27 | 6.27 | 6.17 |
| f/EPD | 1.68 | 1.72 | 1.73 | 1.73 | 1.69 | 1.70 | 1.69 | 1.69 | 1.69 | 1.69 |
| f/f1 | 0.96 | 1.06 | 1.05 | 1.05 | 0.99 | 0.98 | 0.96 | 0.96 | 0.96 | 0.99 |
| \|f8/f7\| | 0.65 | 0.61 | 0.61 | 0.58 | 0.62 | 0.60 | 0.61 | 0.61 | 0.62 | 0.61 |
| R16/f | 1.00 | 0.95 | 0.96 | 0.95 | 0.93 | 0.95 | 0.96 | 0.95 | 0.96 | 0.91 |
| R4/f123 | 0.43 | 0.39 | 0.44 | 0.43 | 0.44 | 0.41 | 0.43 | 0.43 | 0.43 | 0.44 |
| R13/\|R15\| | 0.94 | 0.99 | 1.04 | 1.04 | 0.93 | 0.95 | 0.95 | 0.95 | 0.94 | 1.02 |
| (R3 − R1)/(R3 + R1) | 0.31 | 0.31 | 0.33 | 0.35 | 0.33 | 0.32 | 0.31 | 0.31 | 0.31 | 0.33 |
| f × tan(Semi-FOV)/TTL | 0.76 | 0.72 | 0.72 | 0.74 | 0.73 | 0.74 | 0.76 | 0.76 | 0.76 | 0.75 |
| ΣAT/ΣCT | 0.63 | 0.74 | 0.73 | 0.72 | 0.68 | 0.68 | 0.66 | 0.66 | 0.65 | 0.70 |
| ET3/CT3 | 0.74 | 0.85 | 0.67 | 0.71 | 0.72 | 0.78 | 0.74 | 0.74 | 0.74 | 0.72 |
| SAG61/ SAG71 | 0.61 | 0.63 | 0.61 | 0.69 | 0.64 | 0.57 | 0.60 | 0.61 | 0.61 | 0.56 |

TABLE 21-continued

| | Embodiment | | | | | | | | | |
|---|---|---|---|---|---|---|---|---|---|---|
| Conditional Expresion | 1 | 2 | 3 | 4 | 5 | 6 | 7 | 8 | 9 | 10 |
| DT71/DT81 | 0.65 | 0.66 | 0.63 | 0.66 | 0.66 | 0.71 | 0.67 | 0.67 | 0.67 | 0.65 |
| CT6/(T67 + CT7) | 0.45 | 0.32 | 0.36 | 0.33 | 0.44 | 0.41 | 0.43 | 0.43 | 0.43 | 0.38 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An optical imaging lens assembly, comprising:
   a first lens having refractive power;
   a second lens having refractive power, an image-side surface thereof being concave;
   a third lens having refractive power;
   a fourth lens having refractive power;
   a fifth lens having refractive power;
   a sixth lens having refractive power;
   a seventh lens having positive refractive power, an object-side surface thereof being convex; and
   an eighth lens having negative refractive power, an object-side surface thereof being concave;
   wherein half of a diagonal length ImgH of an effective pixel area on an image plane of the optical imaging lens assembly satisfies: ImgH≥6.0 mm, and
   a total effective focal length f of the optical imaging lens assembly and an entrance pupil diameter EPD of the optical imaging lens assembly satisfy: f/EPD<1.8 and
   a sum ΣAT of air thicknesses between any two adjacent lenses in the first lens to the eighth lens along an optical axis and a sum ΣCT of center thicknesses of the first lens to the eighth lens along the optical axis satisfy: 0.4<ΣAT/ΣCT<0.

2. The optical imaging lens assembly according to claim 1, wherein the total effective focal length f of the optical imaging lens assembly and an effective focal length f1 of the first lens satisfy: 0.7<f/f1<1.2.

3. The optical imaging lens assembly according to claim 1, wherein an effective focal length f8 of the eighth lens and an effective focal length f7 of the seventh lens satisfy: 0.4|f8/f7|<0.8.

4. The optical imaging lens assembly according to claim 1, wherein a radius of curvature R16 of an image-side surface of the eighth lens and the total effective focal length f of the optical imaging lens assembly satisfy: 0.8<R16/f<1.2.

5. The optical imaging lens assembly according to claim 1, wherein a radius of curvature R4 of an image-side surface of the second lens and a combined focal length f123 of the first lens, the second lens and the third lens satisfy: 0.2<R4/f123<0.6.

6. The optical imaging lens assembly according to claim 1, wherein a radius of curvature R13 of an object-side surface of the seventh lens and a radius of curvature R15 of an object-side surface of the eighth lens satisfy: 0.8<R13/|R15|<1.2.

7. The optical imaging lens assembly according to claim 1, wherein a radius of curvature R3 of an object-side surface of the second lens and a radius of curvature R1 of an object-side surface of the first lens satisfy: 0<(R3−R1)/(R3+R1)<0.5.

8. The optical imaging lens assembly according to claim 1, wherein the total effective focal length f of the optical imaging lens assembly, half of a maximal field-of-view Semi-FOV of the optical imaging lens assembly, and an axial distance TTL from an object-side surface of the first lens to an image plane of the optical imaging lens assembly satisfy: 0.5<f×tan(Semi-FOV)/TTL<0.9.

9. The optical imaging lens assembly according to claim 1, wherein an edge thickness ET3 of the third lens and a center thickness CT3 of the third lens on the optical axis satisfy: 0.4<ET3/CT3<1.0.

10. The optical imaging lens assembly according to claim 1, wherein an axial distance SAG61 from an intersection of an object-side surface of the sixth lens and an optical axis to an apex of an effective radius of the object-side surface of the sixth lens, and an axial distance SAG71 from an intersection of an object-side surface of the seventh lens and the optical axis to an apex of an effective radius of the object-side surface of the seventh lens satisfy: 0.5<SAG61/SAG71<0.9.

11. The optical imaging lens assembly according to claim 1, wherein a maximum effective radius DT71 of the object-side surface of the seventh lens and a maximum effective radius DT81 of the object-side surface of the eighth lens satisfy: 0.5<DT71/DT81<0.8.

12. The optical imaging lens assembly according to claim 1, wherein a center thickness CT6 of the sixth lens along the optical axis, a center thickness CT7 of the seventh lens along the optical axis, and an air thickness T67 between the sixth lens and the seventh lens along the optical axis satisfy: 0.1<CT6/(T67+CT7)<0.6.

13. An optical imaging lens assembly, comprising:
   a first lens having refractive power;
   a second lens having refractive power, an image-side surface thereof being concave;
   a third lens having refractive power;
   a fourth lens having refractive power;
   a fifth lens having refractive power;
   a sixth lens having refractive power;
   a seventh lens having positive refractive power, an object-side surface thereof being convex; and
   an eighth lens having negative refractive power, an object-side surface thereof being concave;
   wherein a radius of curvature R16 of an image-side surface of the eighth lens and a total effective focal length f of the optical imaging lens assembly satisfy: 0.8<R16/f<1.2, and
   a radius of curvature R13 of an object-side surface of the seventh lens and a radius of curvature R15 of an object-side surface of the eighth lens satisfy: 0.8<R13/|R15|<1.2.

14. The optical imaging lens assembly according to claim 13, wherein half of a diagonal length ImgH of an effective pixel area on an image plane of the optical imaging lens assembly satisfies: ImgH≥6.0 mm.

15. The optical imaging lens assembly according to claim 13, wherein the total effective focal length f of the optical imaging lens assembly and an entrance pupil diameter EPD of the optical imaging lens assembly satisfy: f/EPD<1.8.

16. The optical imaging lens assembly according to claim 13, wherein the total effective focal length f of the optical imaging lens assembly and an effective focal length f1 of the first lens satisfy: 0.7<f/f1<1.2.

17. The optical imaging lens assembly according to claim 13, wherein an effective focal length f8 of the eighth lens and an effective focal length f7 of the seventh lens satisfy: 0.4<f8/f7|<0.8.

18. The optical imaging lens assembly according to claim 13, wherein a radius of curvature R4 of an image-side surface of the second lens and a combined focal length f123 of the first lens, the second lens and the third lens satisfy: 0.2<R4/f123<0.6.

* * * * *